United States Patent [19]

Fletcher-Haynes

[11] Patent Number: 5,748,504

[45] Date of Patent: May 5, 1998

[54] CALIBRATION METHOD FOR USE WITH ULTRASONIC FLOWMETERS

[75] Inventor: Peter Fletcher-Haynes, Lakewood, Colo.

[73] Assignee: Welch Allyn, Inc., Skaneateles Falls, N.Y.

[21] Appl. No.: 662,080

[22] Filed: Jun. 12, 1996

[51] Int. Cl.$^6$ ......................................................... G01F 3/00

[52] U.S. Cl. .............................. 364/571.01; 364/571.02; 364/571.04; 364/509; 364/510; 73/861.28; 73/1.27

[58] Field of Search ........................... 364/571.01–571.05, 364/509, 510, 143, 152, 153, 155, 166, 176, 178, 179, 183, 480, 481, 505, 506, 524, 550, 551.01, 565, 569, 570, 579, 580, 812; 73/861, 861.02, 861.03, 861.05, 18, 26, 861.27–861.29, 861.31, 195, 196, 152.18, 21, 29, 55, 597, 602, 1.27, 1.34, 1.35, 1.37, 625, 628, 632, 202.5, 204.14, 204.18; 128/725, 724; 137/1, 10; 377/16, 19, 20, 21, 39; 367/89, 13, 105, 117, 900, 901, 903

[56] References Cited

U.S. PATENT DOCUMENTS

| | | | |
|---|---|---|---|
| 4,183,244 | 1/1980 | Kohno et al. | 73/861.26 |
| 4,384,491 | 5/1983 | Brown et al. | 73/861.28 |
| 4,397,193 | 8/1983 | Ryan et al. | 23/861.28 |
| 4,428,805 | 1/1984 | Ogura et al. | 73/861.29 |
| 4,454,767 | 6/1984 | Shinkai et al. | 73/861.18 |
| 4,483,202 | 11/1984 | Ogura et al. | 73/861.27 |
| 4,509,373 | 4/1985 | Brown | 73/861.28 |
| 4,527,433 | 7/1985 | Gutterman | 73/861.28 |
| 4,557,148 | 12/1985 | Akiyama | 73/861.28 |
| 4,616,510 | 10/1986 | Moore | 73/861.27 |
| 4,633,719 | 1/1987 | Heyden | 73/861.28 |
| 4,762,012 | 8/1988 | Brown | 73/1.27 |
| 4,787,252 | 11/1988 | Jacobson et al. | 73/861.28 |
| 5,012,449 | 4/1991 | Todd | 367/89 |
| 5,035,147 | 7/1991 | Woodward | 73/861.28 |
| 5,052,230 | 10/1991 | Lang et al. | 73/861.28 |
| 5,117,698 | 6/1992 | Baumoel | 73/861.28 |
| 5,553,505 | 9/1996 | Bignell et al. | 73/861.28 |

OTHER PUBLICATIONS

Ultrasonic Measurement of Respiratory Flow, D. Plaut and J. Webster, IEEE Transactions on Biomedical Engin., vol. BME-27, No. 10, Oct. 1980, pp. 549–558.

A Pulsed Phase Measurement Ultrasonic Flowmeter For Medical Gases, A. Kou et al, Annals of Biomedical Engine vol. 12, 1984, pp. 263–279. (No date with month).

Design and Construction of an Ultrasonic Pneumotachometer, D. Plaut and J. Webster, IEEE Transactions on Biomedical Engin., vol. BME-27, No. 10, Oct. 1980, pp. 590–597.

*Primary Examiner*—Emanuel T. Voeltz
*Assistant Examiner*—Hal D. Wachsman
*Attorney, Agent, or Firm*—Wall Marjama & Bilinski

[57] ABSTRACT

In a fluid flow measuring apparatus, a flow of fluid is established through the apparatus at a first known flow rate. For each of two states of the apparatus, electrical drive pulses are applied to transmitting transducers. From the output signals of receiving transducers upcount and downcount values are derived which are indicative of the elapsed times between the drive pulses applied to the transmitting transducers and the zero crossings of the output signals of the receiving transducers, with the values being stored in a form that indicates the frequency of occurrence thereof. At least one test is applied to the stored upcount and downcount values to determine if the values have an acceptable distribution and if so using the stored values to determine a first calibration value for the apparatus. Then a flow of fluid is established through the apparatus at a second known flow rate. Again, for each of two states of the apparatus, electrical drive pulses are applied to transmitting transducers. From the output signals of receiving transducers upcount and downcount values are derived which are indicative of the elapsed times between the drive pulses applied to the transmitting transducers and the zero crossings of the output signals of the receiving transducers and from these values a second calibration value for the apparatus is derived. The first and second calibration values are stored for use in calculating unknown flow rates from subsequently measured upcount and downcount values.

20 Claims, 16 Drawing Sheets

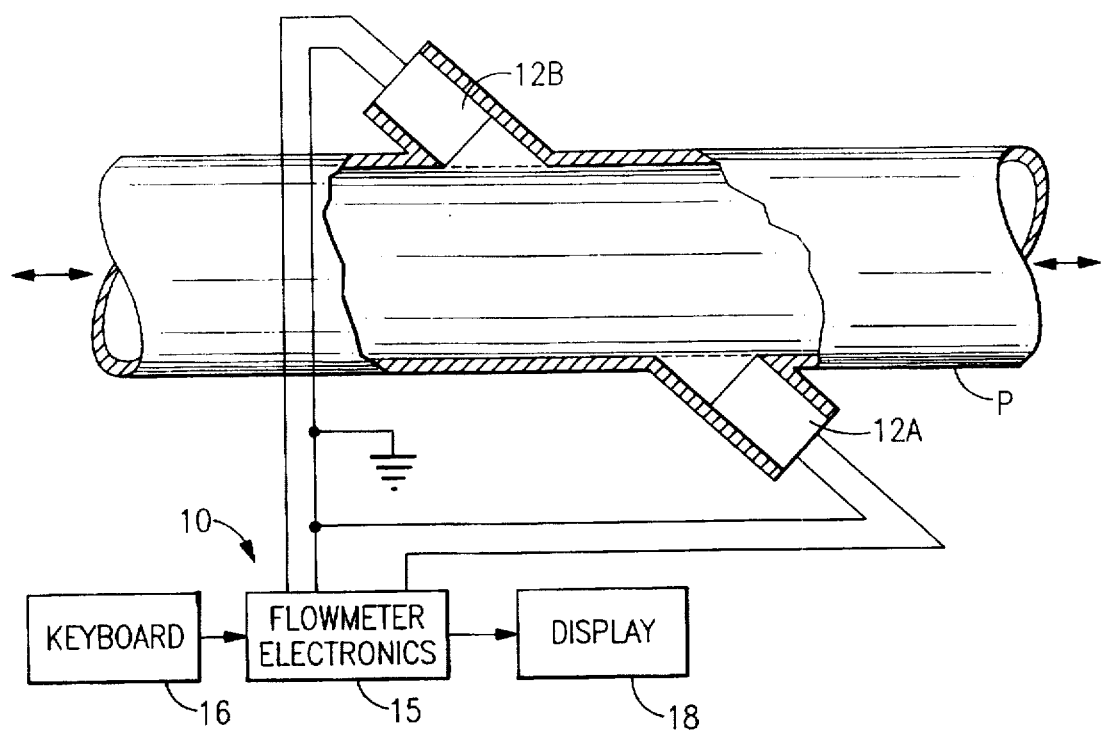
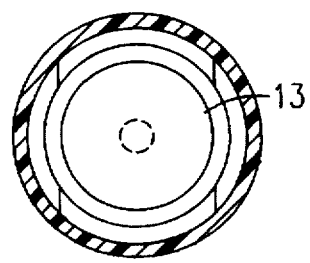
FIG.2A
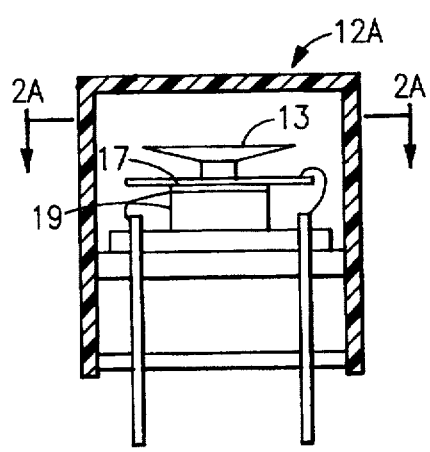
FIG.2B
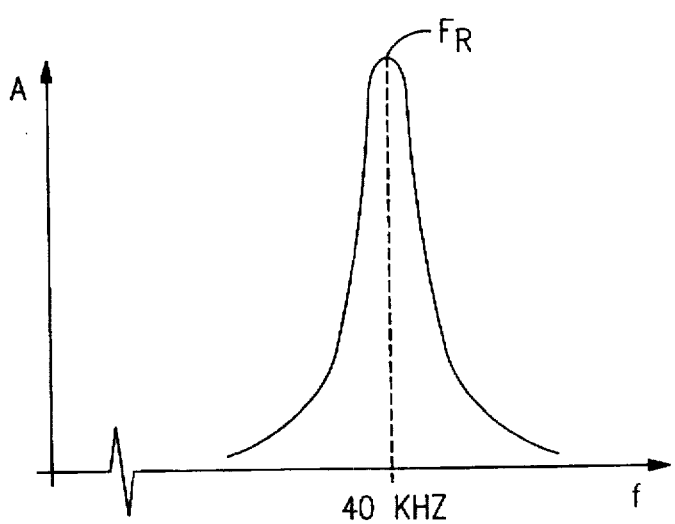
FIG.3

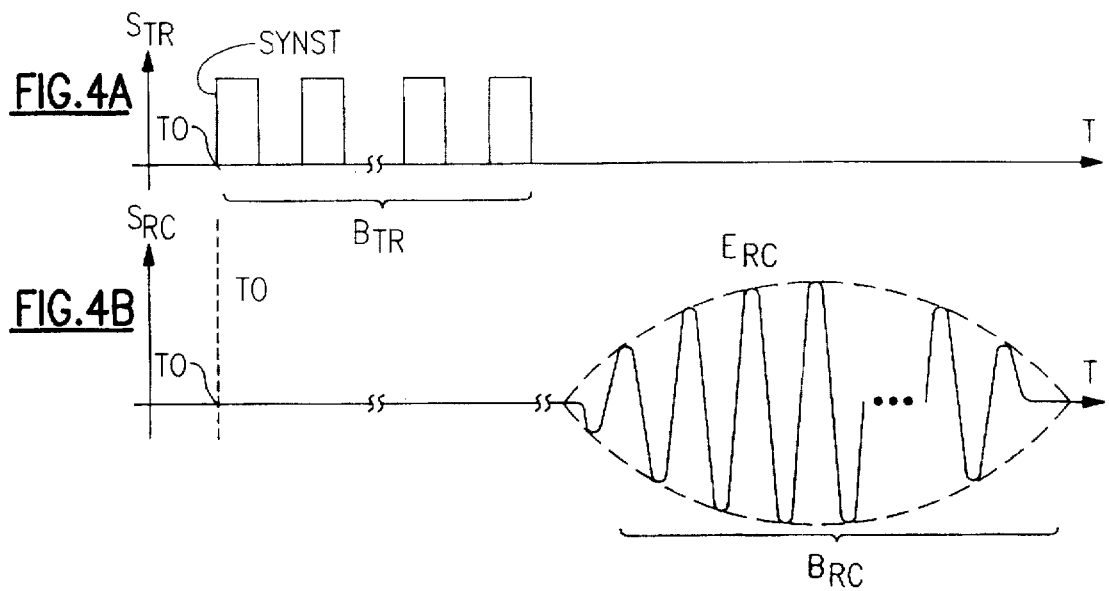
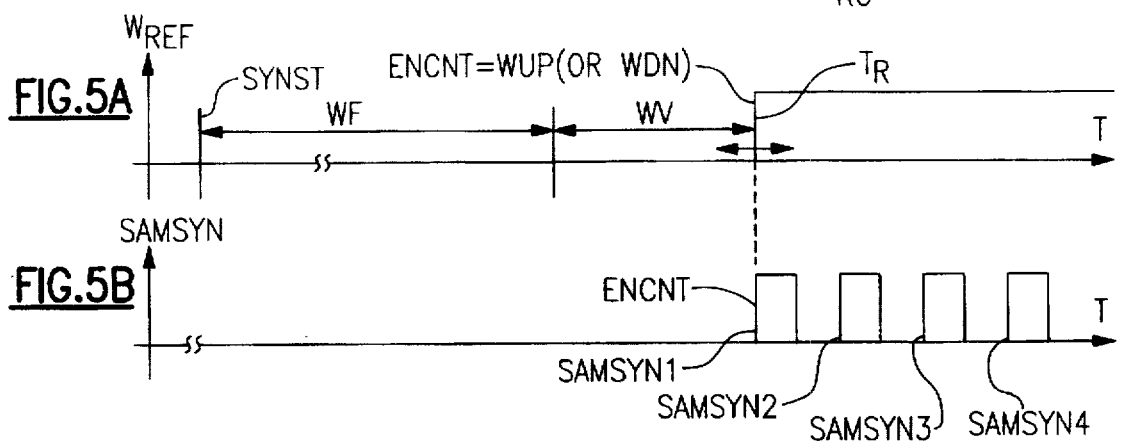
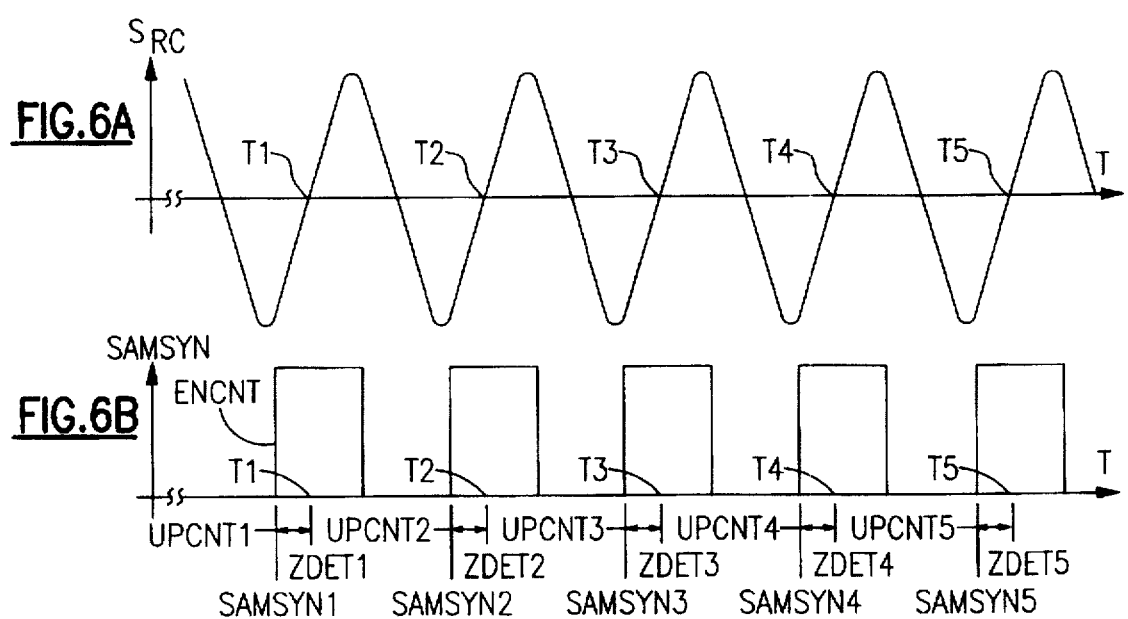

```
127μs(WUP=127) + 4μs(UPCNTI=400)=
126μs(WUP=126) + 5μs(UPCNTI=500)=
125μs(WUP=125) + 6μs(UPCNTI=600)= 131μs
```

```
127μs(WUP=127) + 8μs(UPCNT1=800)=
128μs(WUP=128) + 7μs(UPCNT2=700)=
129μs(WUP=129) + 6μs(UPCNT3=600)=
130μs(WUP=130) + 5μs(UPCNT4=500)=135μs
```

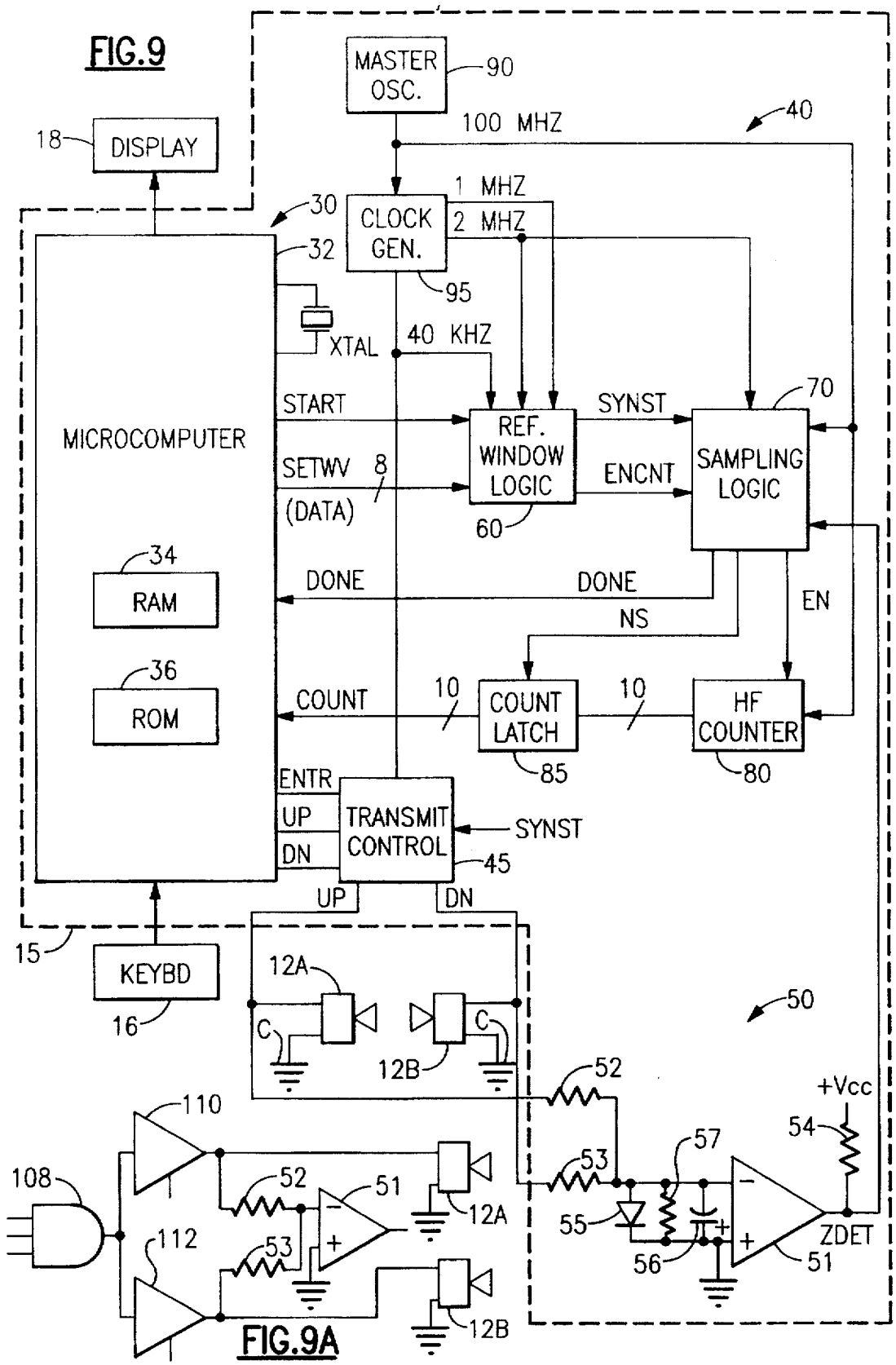

FIG. 13
$$(1)\ \text{FLOW} = [(\text{TUPCNT} - \text{TDNCNT}) - (\text{ZUPCNT} - \text{ZDNCNT})]K_C$$

$$(2)\ K_C = \text{CALIBRATION COEFFICIENT} = \frac{\text{FLOW}}{\text{COUNT}}$$

$$(3)\ \text{TUPCNT} = (\text{WUP}_{CAL} - \text{WUP}_{RUN})N + \text{MUPCNT}$$

$$(4)\ \text{TDNCNT} = (\text{WDN}_{CAL} - \text{WDN}_{RUN})N + \text{MDNCNT}$$

$$(5)\ \text{MUPCNT} = \frac{\sum_{i=1}^{i=8} \text{UPCNT}_i}{8} = \text{AVERAGE MEASURED UP COUNT VALUE}$$

$$(6)\ \text{MDNCNT} = \frac{\sum_{i=1}^{i=8} \text{UPCNT}_i}{8} = \text{AVERAGE MEASURED DOWN COUNT VALUE}$$

(7) ZUPCNT = UP COUNT AT ZERO FLOW (CALIBRATION)

(8) ZDNCNT = DOWN COUNT AT ZERO FLOW (CALIBRATION)

FIG. 14
$$(1)\ \text{FLOW}\langle TC\rangle = [(\text{TUPCNT}\langle TC\rangle - \text{TDNCNT}\langle TC\rangle) - (\text{ZUPCNT} - \text{ZDNCNT})]K_C$$

$$(2)\ \text{MUPCNT}\langle TC\rangle = \frac{\sum_{i=1}^{i=8} \text{UPCNT}_i}{8} - \frac{\sum_{i=1}^{i=7} \text{UPDIFF}_i}{7} \cdot K_U$$

$$(3)\ \text{MDNCNT}\langle TC\rangle = \frac{\sum_{i=1}^{i=8} \text{DNCNT}_i}{8} - \frac{\sum_{i=1}^{i=7} \text{DNDIFF}_i}{7} \cdot K_D$$

$$(4)\ \text{DIFF}_i = \frac{\text{CNT}(i+1) - \text{CNT}(i)}{2}$$

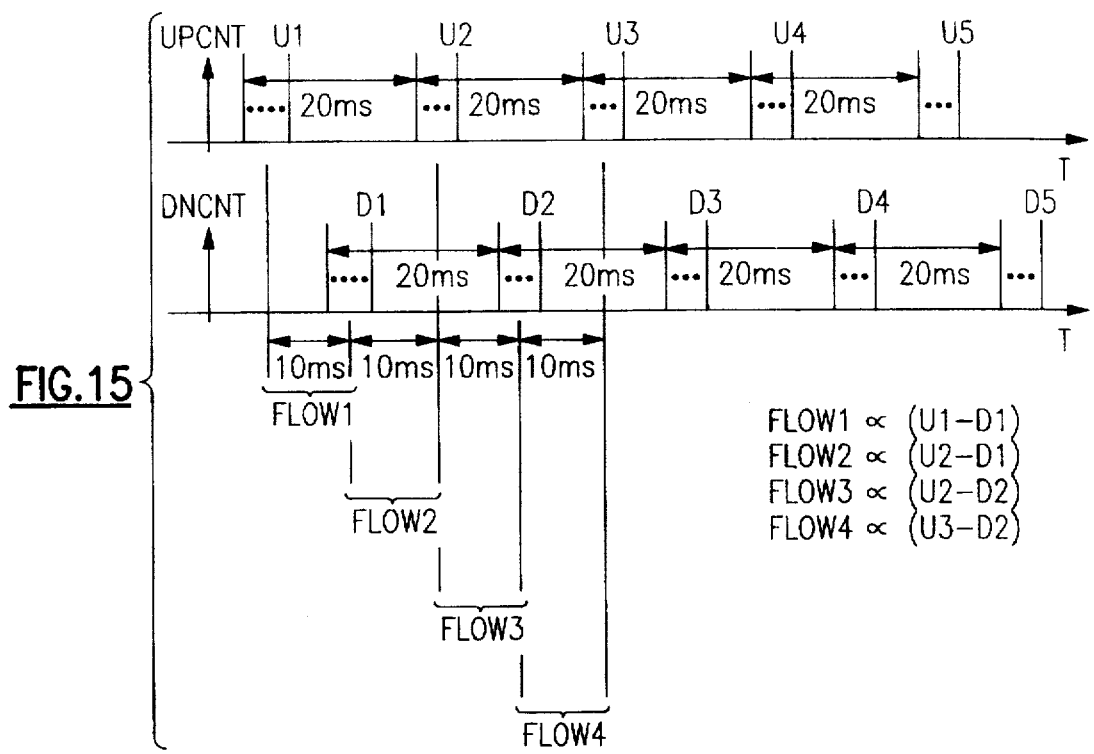
FIG.15
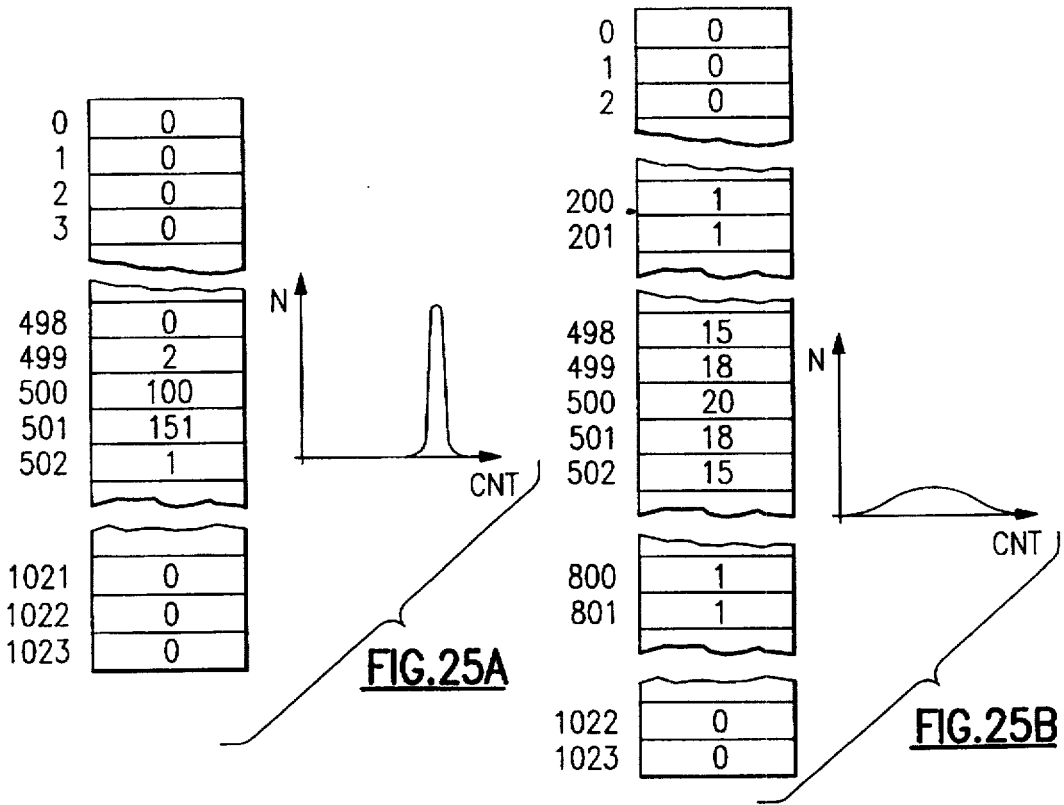
FIG.25A
FIG.25B

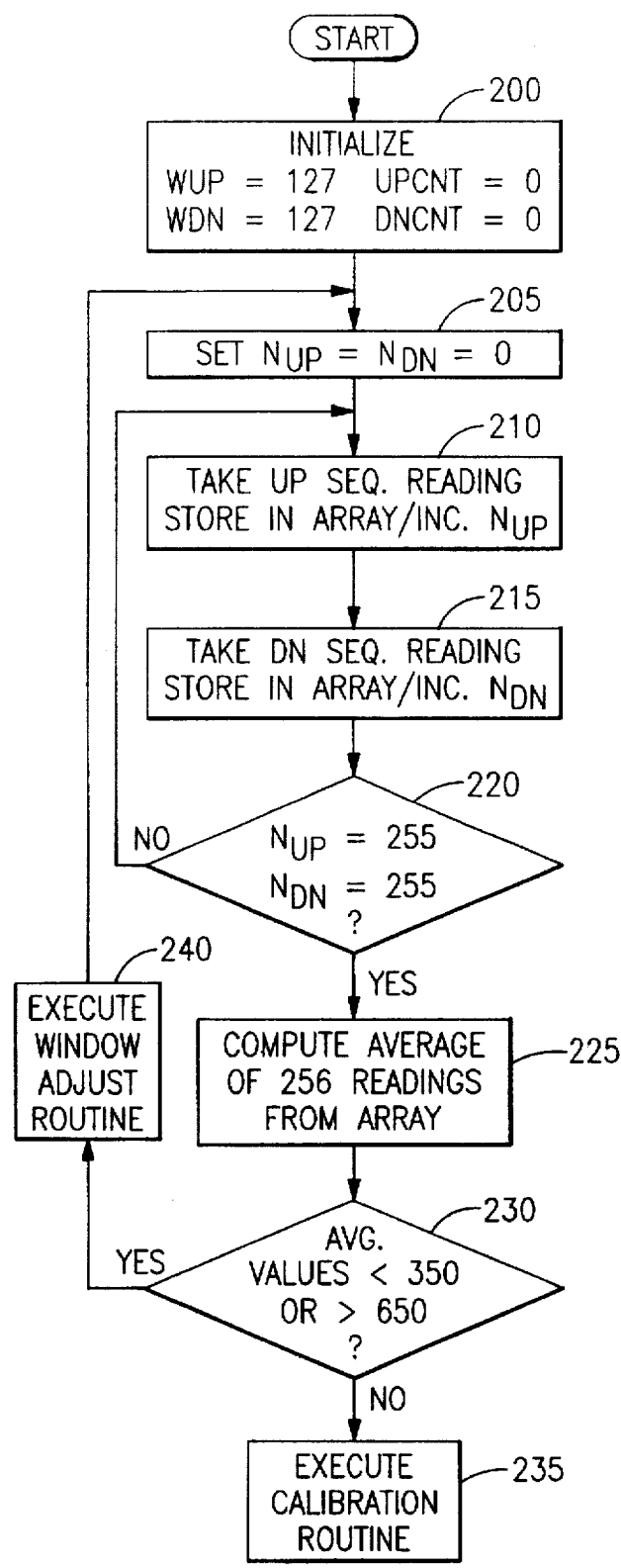
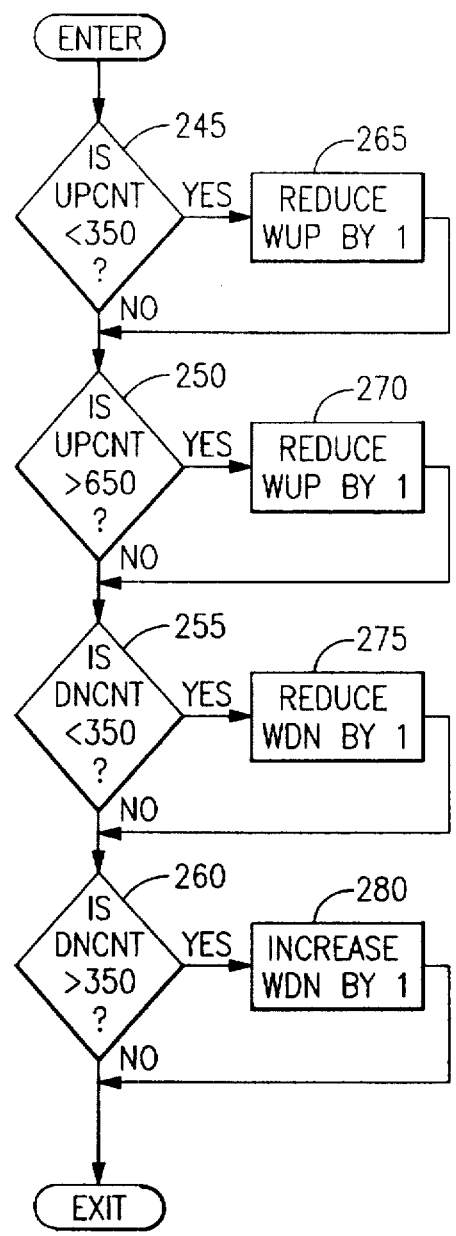
FIG. 17 - START-UP ROUTINE
FIG. 18 - WINDOW ADJUST ROUTINE

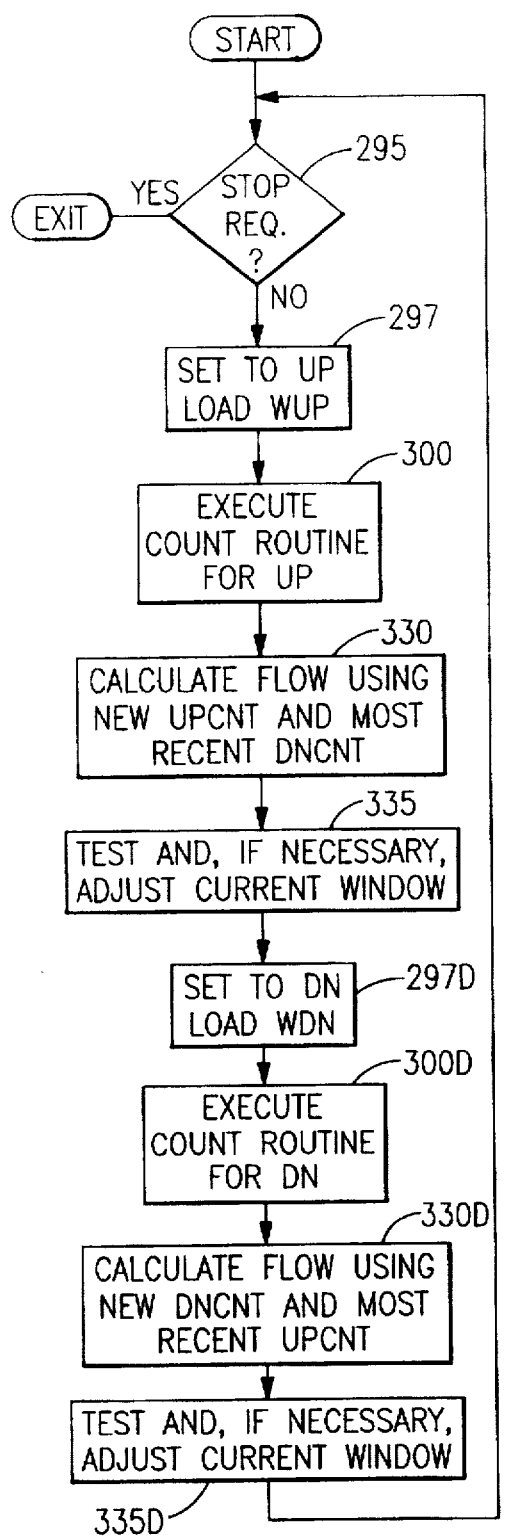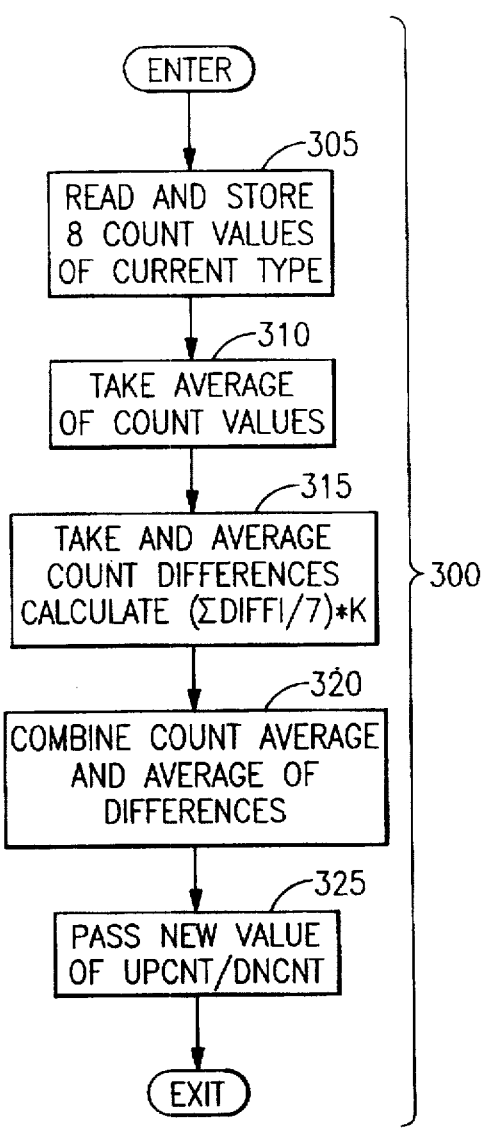
FIG.19 – FLOW MEASUREMENT ROUTINE
FIG.20 – COUNT ROUTINE

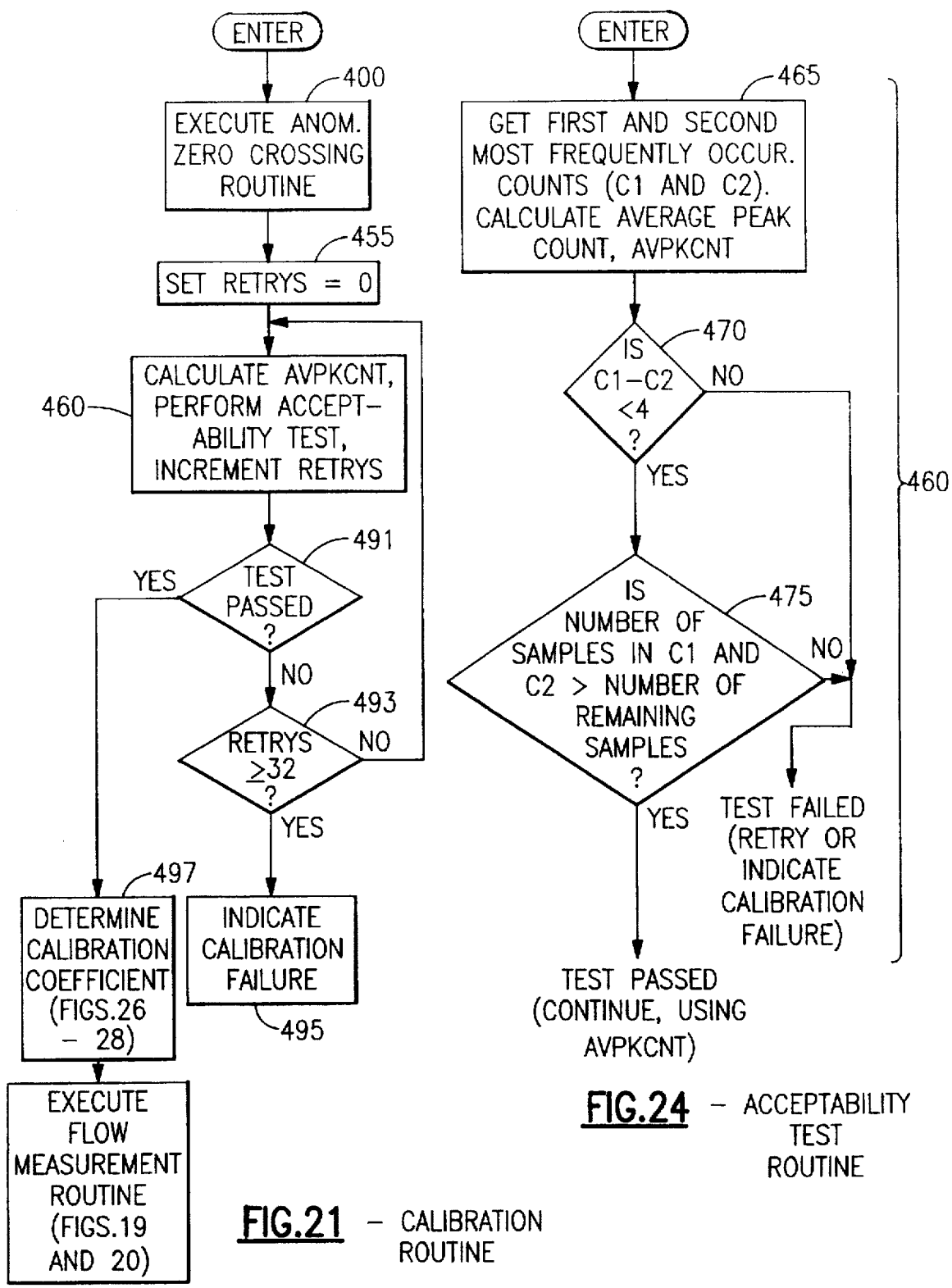
FIG.21 - CALIBRATION ROUTINE
FIG.24 - ACCEPTABILITY TEST ROUTINE

ND METHOD FOR USE WITH
CALIBRATION METHOD FOR USE WITH ULTRASONIC FLOWMETERS

BACKGROUND OF THE INVENTION

The present invention relates to ultrasonic flowmeters, and is directed more particularly to ultrasonic flowmeters for bidirectionally measuring the rate of flow of breath, i.e., to ultrasonic spirometers.

Many types of flowmeters have been developed to solve the problem of measuring the rate of flow and/or volume of flow of fluids through pipes, ducts, conduits, etc . . . One major class of such flowmeters includes flowmeters such as turbine flowmeters, vortex shedding flowmeters and the like, which require the presence of flow obstructing structures, such as turbine blades, in the flow path. Because of the presence of these obstructing structures, the flow to be measured may not accurately reflect the value that the flow would have if no obstruction were present. This is because these obstructions cause pressure drops and turbulence which disturbs the organization of the flow and gives rise to back pressures.

In order to overcome these difficulties, there have been developed various types of flowmeters which do not require the presence of obstructions in the flow path. One of these types of flowmeters includes ultrasonic flowmeters. In flowmeters of this type the rate of fluid flow is measured by the effect of fluid flow on the time required for acoustic energy in the form of ultrasonic waves to propagate between sound transmitters and receivers positioned on opposite sides of the flow path. This time is often referred to as the "time-of-flight" of the ultrasonic waves. One example of an ultrasonic flowmeter of this type that is adapted for use with industrial piping and pipelines is described in U.S. Pat. No. 4,454,767 (Shinkai, et al).

Experience with ultrasonic flowmeters has revealed that the best results are achieved when the ultrasonic generators and receivers are located in an upstream/downstream relationship with one another and form an oblique angle of incidence with the direction of flow of the fluid to be measured. It has also revealed that most accurate results are achieved when the measurement is based on measurements of differences between the time-of-flight times of ultrasonic waves which are transmitted in opposite directions across the fluid flow path by transducers that are adapted to both transmit and receive such waves. Such differences in time-of-flight time may be accurately measured by means of the phase differences to which they give rise, provided that there are no associated phase ambiguities. An example of an ultrasonic flowmeter of this type is described in U.S. Pat. No. 4,483,202 (Ogura, et al).

In many ultrasonic flowmeters of the above mentioned type two ultrasonic waves, an upstream wave and a downstream wave, are transmitted alternately and sequentially in opposite directions across the flow path. In such ultrasonic flowmeters the rate of flow is determined from differences between the time-of-flight of the up-to-down (U/D) and down-to-up (D/U) phases of the ultrasonic wave generating cycle, as reflected by the occurrence times of selected zero crossings of the received ultrasonic waves. An example of an ultrasonic flowmeter of this type is described in U.S. Pat. No. 5,117,698 (Baumoel).

One particularly advantageous use for ultrasonic flowmeters of the above-discussed type includes flowmeters for measuring respiratory flow, i.e., the rate of flow of gases breathed by living creatures. When used for this purpose ultrasonic flowmeters are often referred to as spirometers, a general term that also includes non-ultrasonic breath-flow meters such as pneumotachometers. Examples of ultrasonic spirometers are described in U.S. Pat. No. 4,425,805 (Ogura, et al), and in "Design and Construction of an Ultrasonic Pneumotachometer", D. Plant and J. Webster, IEEE Transactions on Biomedical Engineering, Vol. BME-27, No. 10, Oct. 1980.

While known ultrasonic flowmeters are reasonably accurate, they have a number of deficiencies which limit the applications to which they may be put. One of these deficiencies is that the occurrence times of the zero crossings of the received ultrasonic waves must be measured both with a very high accuracy and over a broad range of time values. Accurate measurements of flow may, for example, require the resolution of zero crossing times as short as ten nanoseconds (ns) in ultrasonic wave propagation events having total durations of 200 to 300 microseconds ($\mu s$). As a result, ultrasonic flowmeters have, prior to the present invention, been thought to require the use of circuitry having a large numbers of bits, e.g. 15 or more, that are associated with high resolution over a wide range. They have also been thought to require the high clock rates and fast rise times that are associated with the need to resolve large numbers of closely spaced bits.

Another deficiency of known ultrasonic flowmeters is that, for practical reasons, ultrasonic waves must be generated not as single pulses, but rather as sets or bursts of pulses. As a result, the measurement of small phase differences must be made for a signal that has not one but many zero crossings, and that has multiple zero crossings of both the negative-to-positive (positive going) type and the positive-to-negative (negative going) type. Since the confusion of the zero crossing of interest with other zero crossings, including zero crossings of the opposite sign, will result in large errors, ultrasonic flowmeters must make provision for preventing the occurrence of phase ambiguities.

Still another deficiency of ultrasonic flowmeters known prior to the present invention is that known circuitry which is able to transmit and receive ultrasonic waves bidirectionally has a relatively high cost. One reason for this relatively high cost is that ultrasonic transducers have a low efficiency both as transmitters and receivers. Because of this low efficiency, it has been thought necessary to include drive amplifiers for the transmit circuits and preamplifiers for the receive circuits. Amplifiers of this type are shown and described in U.S. Pat. No. 4,787,252 (Jacobson, et al).

Another reason for the relatively high cost of ultrasonic transmitting and receiving circuitry is the need either to provide two transmitter and receiver circuits, one for each of the up and down transmission sequences, or to provide reversing circuitry that allows a single transmitter and a single receiver circuit to be used for both the up and the down sequences. Examples of ultrasonic flowmeters that include such reversing circuits are described in the above-cited Jacobson, et al. patent and in U.S. Pat. Nos. 5,052,230 (Lang, et al) and 4,557,148 (Akiyama).

The first of these types of circuits have the disadvantage not only that the cost of their transmitter and receiver circuits is twice as great as that of the second, but also that their transmitter and receiver circuits need to be relatively closely matched and are subject to common mode error. The second of these types of circuits have the disadvantage not only of including the cost of a reversing circuit, but also the disadvantage of including both a relatively high power reversing switch for the transmitter circuit and a relatively low power reversing circuit for the receiver circuit. In addition, since these reversing circuits are analog rather than digital, they are also subject to all the deficiencies of analog circuitry, such as mismatch, offset errors and temperature drift.

Because of the above-discussed requirements, ultrasonic flowmeters constructed prior to the present invention have been believed to require the use of circuit designs and circuit elements which are complex and/or expensive. As explained above, the need for high resolution time measurements have been thought to require the use of circuit elements with relatively large numbers of bits and relatively fast rise-times. Similarly, the need for avoiding or correcting zero crossing errors have been thought to require powerful phase locking circuitry. Finally, the need for pairs of transmitter and receiver circuits have been thought to require the use of closely matched circuit elements or common mode error compensating circuitry. Thus, a need has existed for an ultrasonic flowmeter that provides the desired accuracy without the use of complex and/or expensive circuitry.

SUMMARY OF THE INVENTION

In accordance with the present invention there is provided an improved ultrasonic flowmeter which eliminates the above-discussed deficiencies, and yet which does not require the use of complex or expensive circuits or circuit elements. More particularly, the invention eliminates the need for circuit elements having relatively large numbers of bits, or relatively fast rise times, or circuit elements requiring close component matching or common mode compensation. It also provides improved hardware and software implemented features which, although low in cost, enable the flowmeter to provide an accuracy and resolution which is comparable to or better than the more complex and/or expensive flowmeters used heretofore. As a result, a flowmeter constructed in accordance with the invention can be used in applications in which the use of known flowmeters having a comparable accuracy and repeatability would be prohibitively expensive.

Generally speaking, the flowmeter of the invention comprises an ultrasonic flowmeter of the type which transmits and receives ultrasonic waves alternately in opposite directions, but which does so with new and simpler circuitry that is of an inexpensive and ordinary type, and with improved software that assures undiminished accuracy and high speed. In accordance with one important feature of the invention, this is accomplished by using upstream and downstream transducers which operate with transmitting and receiving circuits that are substantially digital in character, and which are used with timing circuits that are also substantially digital in character. Because of this digital character, no appreciable differences can arise between the way that the ultrasonic transmitters transmit ultrasonic waves, or in the way that the ultrasonic receivers receive those ultrasonic waves. As a result, the flowmeter of the invention is simpler than flowmeters which have analog transmitting and receiving circuits, and has no need for the close component matching and/or tight tolerances that characterize such flowmeters. The flowmeter of the invention also provides high common mode rejection.

In accordance with another feature of the invention, the flowmeter includes a high Q resonant transducer in place of the "piston-type" transducer that has been used heretofore. This transducer has both a high input impedance and a high sensitivity to mechanical oscillations over a narrow band of frequencies that is centered on its resonant frequency. In the preferred embodiment, this transducer is used in conjunction with a digital drive signal, preferably a squarewave, that has a frequency which is equal to this resonant frequency. A signal of the same frequency is also used in the reception of the ultrasonic waves.

During transmission, the matching of the drive signal frequency and the transducer resonant frequency assures that the ultrasonic wave is generated in a highly efficient manner using a relatively small amount of power. At the same time, the high Q of the transducer causes an attenuation of the odd harmonics of the drive signal and, consequently, in the generation of a substantially sinusoidal ultrasonic wave. Together these features allow the transmitting transducer to be directly driven, i.e., driven without an output amplifier or drive stage, and without a waveshaping filter. As a result, the transmit circuitry of the flowmeter of the invention may be simpler and less expensive than the transmit circuitry of previously known flowmeters.

During reception, the matching of the received signal frequency and the transducer resonant frequency assures that the ultrasonic wave is received with a high sensitivity and selectivity. Because the received signal has the same frequency as the transmitted signal, the zero crossing of the received signal may be timed by means of a digital sampling signal that has the same frequency as the drive signal. Because of this sameness of frequency and high sensitivity at that frequency, the receiver circuitry may also be directly driven, i.e., operate without preamplifiers or waveshaping circuits. As a result, the receiving circuitry of the invention to be simpler and less expensive than the ultrasonic receiving circuitry of previously used flowmeters.

In accordance with still another feature of the invention, the flowmeter uses at least one dynamic or adaptive reference window signal which allows the zero crossings of the received ultrasonic signal to be detected with a high resolution, without using circuit elements such as counters having high numbers of bits. In the preferred embodiment, the flowmeter uses two reference window signals, each of which includes two or more components. A first component, having a fixed duration, begins with the beginning of the ultrasonic burst and occupies the greater portion of the time-of-flight of the ultrasonic waves. During this component of the reference window signal, no attempt is made to detect the zero crossings of the received signal, since it is known that it is then too early for the signal to have reached the receiving transducer. A second component, having a variable duration, begins at the end of the first component of the reference window signal and ends with a reference transition that occurs at a variable time thereafter. This reference transition marks the beginning of a reference window during which measurements are made of the times that elapse between the transitions of the sampling signal and respective zero crossings of the received signal. This is preferably accomplished with high resolution by counting only the number of high frequency clock pulses that occur between these sampling transitions and zero crossings. In this way, high resolution measurements may be made even though the counter has only a relatively small number of bits.

Significantly, the reference window is maintained in the desired relationship to the received signal, over a wide range of flow rates, by dynamically shifting the boundaries reference transition so that the transitions of the received signal remain associated with corresponding transitions of the sampling signal over all flow rates within this wide range. Stated differently, each zero crossing is made to remain within a respective sampling window that is defined by successive pairs of sampling transitions. In accordance with the invention, this is accomplished by comparing the above-mentioned count to the capacity of the counter in which it is stored and, when the count deviates too much from the mid-range count of the counter, shifting the reference transition so that subsequent counts fall more nearly at that mid-range count. This not only assures that data is not lost or "clipped" as a result of the counter operating too near its maximum or minimum count values, it also assures that even rapidly changing rates of flow do not cause the counter to overflow between successive zero crossings and thereby restrict the transient response of the flowmeter. This feature will hereinafter be referred to as the "dynamic (or adaptive) reference window" of the invention.

In order to take the fullest advantage of the above-mentioned adaptive reference window, a relationship of interchangeability and commensurability is maintained between the reference transition and the sampling windows. This means that both the occurrence time of the reference transition and the widths of the sampling windows may both be expressed in terms of whole numbers of clock pulses. This relationship is desirable because it allows the reference transition to be shifted (i.e., advanced or retarded) with respect to a respective burst without giving rise to phase ambiguities. In other words, phase integrity is maintained because the flowmeter never loses track of the association between a particular sampling transition of the sampling signal and a particular zero crossing of the received signal. This feature will hereinafter be referred to as the "phase tracking" feature of the invention.

In the preferred embodiment, the above-described features are implemented by hardware and software that makes use of a single predetermined type of zero crossing, namely: a positive-going zero crossing. One advantage of using a single type of zero crossing is that it allows the use of a zero crossing detector or circuit (such as a comparator with an open collector output and pull-up resistor) which has an output voltage that slews rapidly in only one direction. This eliminates the need for comparators which have output voltages that slew rapidly in both directions, and thereby further reduces the cost of the flowmeter circuitry. Another advantage is that it causes the flowmeter to provide more consistent results by avoiding the potential phase ambiguities that are associated with the use of positive and negative-going zero crossings that must be accommodated interchangeably.

To assure that the flowmeter of the invention provides results which are not only good, but also consistent and repeatable, it is desirable that the flowmeter begin timing the zero crossings of the received signal at some time after the beginning of the received burst. This is because the received burst has a magnitude that progressively increases from zero to a maximum value. Stated differently, the received burst has an amplitude envelope the early portions of which have amplitudes that are too low to provide the desired sharply defined zero crossings. In order to effectively eliminate the effect of these early portions of the received burst, data may be taken for all zero crossings, and data for the first several thereof discarded. Alternatively, the effect of these early portions may be eliminated by causing the leading edge of the reference window to occur a predetermined time after the first zero crossing of the received burst.

Similarly, it is desirable that flow measurements not be based on sample data from the late portions of the received signal. Advantageously, data from additional late occurring zero crossings, may be discarded in order to maintain the total number of samples on which flow measurements are based to a predetermined fixed number, such as eight. In other words, the generation and/or reception of ultrasonic waves may be discontinued after data for the desired number of samples has been taken or after the elapse of a preset time. This discontinuation has the advantage that it allows ultrasonic bursts to be separated by shorter times, thereby allowing the burst frequency of the flowmeter to be longer than would otherwise be the case. If this technique is used, the flowmeter may be said to include a feature that will hereinafter be referred to as "squelch" control.

In accordance with yet another feature thereof, the flowmeter of the invention provides for the oversampling of the received ultrasonic signal. This means that the flow rate of the fluid is determined not from the occurrence times of a single transition of the sampling signal and a single corresponding zero crossing of the received burst, but rather from the average of many such occurrence times of zero crossings. This oversampling serves to reduce the effect of random sources of error, such as noise and phase jitter, and thereby improves the repeatability of the flow measurement process. As a result, the result of a flow rate measurement is more linearly related to the phase position of the received burst as a whole. Particularly when used in conjunction with the high sampling rate contemplated by the invention, e.g., 100 samples per second, this oversampling improves repeatability without sacrificing the ability of the flowmeter track changes in flow rate of the kind that are likely to be encountered in applications such as spirometers.

The high sampling rates contemplated by the present invention may be further increased by performing the flow calculations on the basis of interleaved sets of successive up/down transmission and reception events. The use of such interleaved events allows the number of flow measurements per unit of time to be equal to the total number of reception events for both transducers, rather than to the total number of reception events for either transducer. This interleaving is possible because the use of the above-mentioned types of transducers in the above-described manner to be used interchangeably. As the result, measurements are equally valid without regard to the order in which data produced by those transducers are used. This allows the sampling rate of the flowmeter to be twice as great as that of flowmeters that have transducers which produce data which is not interchangeable. This doubling of the sampling rate is particularly beneficial in applications in which volume of flow is calculated from the rate of flow by summing data taken for a succession of flow rate values. This is because increasing the number of samples per unit time allows the flow rate values to more closely approximate the flow through a flowmeter having a flow rate which varies significantly as a function of time, e.g., a spirometer.

Yet another desirable feature of the flowmeter of the invention is its ability to compensate for the effect of variations in the temperature of the transducers. This feature is based on the fact that the resonant frequencies of the ultrasonic transducers vary in a predictable manner with temperature, while the frequency of the drive and sampling signals are substantially independent of temperature. This difference causes the measured count values to change in a reasonably predictable manner, during the course of each up or down transmission-reception event, by an amount that varies with the difference between the actual temperature of the transducer and the temperature at which the transducers operate at there nominal resonant frequencies. In accordance with the invention this change is quantified and used to correct the flow rate for the effect of temperature. In a first embodiment, the correction is made by adjusting the count values before they are used in fluid parameter calculations.

In a second embodiment, the correction is made by adjusting the magnitude of the fluid parameter after it has been calculated.

A final, and very important feature of the flowmeter of the invention is the method used in calibrating it. This method is based on the recognition that the calibration process is so important to the validity and accuracy of subsequently taken measurements that data taken during calibration should be used only if it meets strict acceptability criteria. One particularly important one of these criteria is a negative one, namely: the absence of a significant degree of bimodality in the distribution of the calibration data, i.e., the absence of excessively separated peaks in distribution of the calibration data. In cases where this degree of bimodality is high, the cause is likely to be a condition in which the flowmeter is not tracking a zero crossing of the proper type. Even at lower degrees of bimodality, however, an unacceptable phase ambiguity may be indicated. Thus, the calibration method of the invention requires the performance of at least one statistical test of the degree of bimodality in the distribution of the calibration data and for re-performing part or all of the calibration process if any of these tests have failed.

In the preferred embodiment of the invention, the calibration process also includes positive acceptability criteria for the calibration data. The most important of these is the presence of a minimum degree of concentration or bunching in the distribution of the calibration data. This means that the distribution of the calibration data must have a concentration of values that peaks at the operating point and that most of the calibration data falls in or near this region of this concentration or peak, i.e., having low variance. In this way, the occurrence of even small deviations from the intended manner of operation of the invention may be detected and identified for correction. As a result, actual measurements are taken only after the calibration process of the invention indicates that no systematic sources of error are present.

DESCRIPTION OF THE DRAWINGS

Other objects and advantages of the invention will be apparent from the following description and drawings, in which:

FIG. 1 is a fragmentary cross-sectional view of a flowmeter constructed in accordance with the invention;

FIGS. 2A and 2B are top and side cross-sectional views, respectively, of one of the ultrasonic transducers of the flowmeter of FIG. 1;

FIG. 3 shows the frequency characteristic of the transducer of FIGS. 2A and 2B;

FIGS. 4A and 4B, 5A and 5B, and 6A and 6B show the waveforms of selected ones of the signals produced by the flowmeter of the invention;

FIG. 9 is a block-schematic diagram of the flowmeter of FIG. 1;

FIG. 9A is a fragmentary schematic diagram of the drive circuitry for transducers 12A and 12B;

FIGS. 13 and 14 are tables showing selected equations which govern the operation of the flowmeter of FIG. 1;

FIG. 15 is a sequence diagram which shows the interleaved sampling used by the flowmeter of FIG. 1;

FIGS. 17–22 are flow charts which illustrate the operation of the apparatus and method of the invention;

FIG. 24 is a flow chart showing exemplary acceptability tests that may be used in the calibration of the flowmeter of the invention;

FIGS. 25A and 25B show two different distributions of sample count data measured by the flowmeter of FIG. 1;

DESCRIPTION OF THE PREFERRED EMBODIMENTS

Figures 7A, 7B, 8A, 8B:
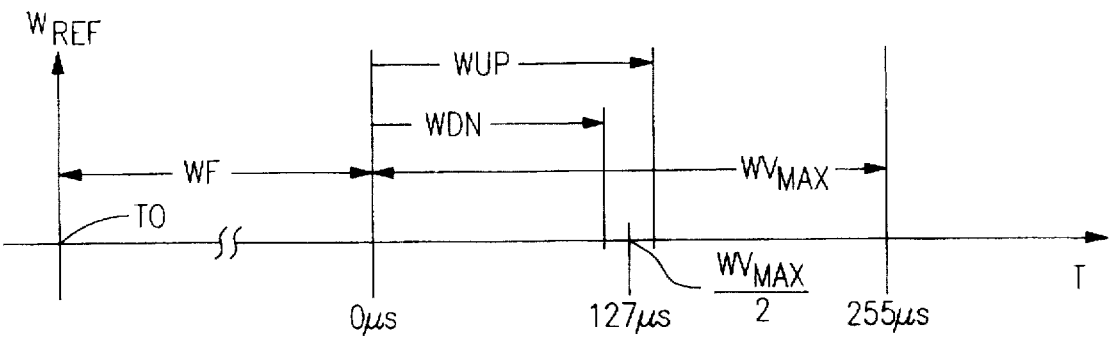
FIGS. 7A and 7B shows exemplary values for selected ones of the signals shown in FIGS. 5A and 5B, 6A and 6B.
FIGS. 8A and 8B illustrate the adjustability of the reference signal.

Referring to FIG. 1 there is shown a fragmentary cross-sectional view of a pipe or other conduit P for conducting the flow of a fluid, such as air, natural gas, oil, etc. Also shown in FIG. 1 is an ultrasonic flowmeter, indicated generally by the designation 10, for measuring a parameter of the flow of this fluid, such as volume rate of flow or total volume of flow. If flowmeter 10 is used to bidirectionally measure the air inhaled or exhaled by a living creature, it is properly referred to as a spirometer. While the present invention was developed for use as a spirometer, its usefulness is not limited to spirometers. Accordingly, except where specifically otherwise indicated, the following description will be understood to apply equally to flowmeters that are used as spirometers and to flowmeters that are used for other purposes.

Generally speaking, flowmeter 10 of FIG. 1 includes a pair of ultrasonic transducers 12A and 12B, and a flowmeter electronic control unit 15 which serves to control the transmission and reception of ultrasonic signals thereby. Flowmeter electronic control unit 15 (often hereinafter abbreviated to "flowmeter") also serves to process the results of the transmission and reception process and to calculate therefrom the desired fluid flow parameter, such as flow rate. Flowmeter 15 is preferably equipped with a suitable data input device, such as keyboard 16, through which it may be supplied with user selectable constants and mode control commands, and a data output device, such as a display 18, through which it may communicate the results of its measurements to an operator or host processor.

In accordance with one important feature of the present invention, transducers 12A and 12B preferably comprise piezoelectric transducers which have a frequency characteristic, such as that shown in FIG. 3, with a resonant frequency $F_R$ and a high Q value. This high Q value assures that transducers 12A and 12B are highly responsive only to signals having frequencies at or near resonant frequency $F_R$, and have a relatively high input impedance at such frequencies. These properties are highly advantageous for the flowmeter of the invention because they make it possible for the transducers to transmit and receive approximately sinusoidal ultrasonic waves having a usable amplitude, even when they are driven by signals that have a low power level and a high harmonic content. As a result, the drive and receive circuits for the transducers need not include dedicated output or input amplifiers, or dedicated waveshaping or filter circuits. Thus, it is possible to drive the transducers directly with ordinary digital integrated circuit devices, such as tri-state buffers or gates, and to receive signals directly from the transducers with an ordinary analog integrated circuit device, such as a comparator, thereby greatly reducing the complexity and cost of the drive and receive circuits of the flowmeter.

In the preferred embodiment, transducers 12A and 12B are low cost miniature ultrasonic transducers of the type commonly used in garage door openers and truck back-up alarms. Such transducers typically have a resonant frequency of 40 KHz and a frequency response of the type shown in FIG. 3. They also have a diameter on order of 1.5 cm, a diameter well suited for use with breathing tubes of the sizes used in spirometers.

The internal structure of one ultrasonic transducer of the above mentioned type is shown in enlarged cross-sectional form in FIGS. 2A and 2B. As is best shown in FIG. 2B, these transducers include an aluminum sound focusing cone 13 which is driven by a piezoelectric crystal 17 that is supported on a ceramic base 19. Because of the low mass and the focusing properties of cone 13, the illustrated transducer produces a directional beam of ultrasonic waves having a relatively high amplitude, at relatively low drive power levels, at least when it is operated at or near its resonant frequency.

Referring to FIG. 4A there is shown the waveform of a digital transmit or drive signal $S_{TR}$ suitable for use in driving transducers 12A and 12B. When this drive signal is applied to the input of one transducer, it causes that transducer to emit a generally sinusoidal ultrasonic wave in the direction of the other transducer. When this wave propagates through the fluid in pipe P and strikes the other transducer, it causes that transducer to generate a generally sinusoidal AC output signal $S_{RC}$, which has the general shape shown in FIG. 4B. These waveforms will be understood to apply to each of transducers 12A and 12B, since each transducer must be able to both transmit and receive ultrasonic waves.

Drive signal $S_{TR}$ preferably includes a plurality of square wave drive pulses which together comprise a "drive burst" or "burst" $B_{TR}$. A plurality of these pulses is desirable because the receiving transducer has an inertia that must be overcome and, consequently, requires several drive pulses before its output signal $S_{RC}$ builds up to a usable magnitude. This build-up causes the leading and trailing portions of received burst $B_{RC}$ to have a reduced magnitude, as may be seen from the shape of the signal envelope $E_{RC}$ that bounds received burst $B_{RC}$ in FIG. 4B.

For the sake of clarity, received signal $S_{RC}$ is shown at a different vertical scale than transmitted signal $T_{RC}$. In actuality, the peak values of the received signal are substantially smaller than those of the transmitted signal. They also occur at a much later time than is suggested by FIGS. 4A and 4B, this later time being indicated by the breaks shown in the time axis of FIG. 4B. In spite of these differences these differences in amplitude and occurrence time, however, it will be understood that the periods of the transmitted and received signals are equal to one another. This should not be understood, however, as suggesting that the number of 40 $kH_z$ drive periods and the number of AC cycles in the received signal are equal to one another. In other words, while the number of transmitted and received bursts will be equal to one another in fundamental frequency, the durations of these bursts will, in general, not be equal to one another.

When transducer 12A is the transmitting transducer and transducer 12B is the receiving transducer, the flowmeter is said to be in its "down" state. Conversely, when transducer 12B is transmitting and transducer 12A is receiving, the flowmeter is said to be in its said "up" state. The terms "UP" and "DOWN" will be understood to be relative, since the important thing is that the "up" and "down" states be associated with transmission in opposite directions, and not with particular directions of fluid flow. Stated differently, the flowmeter will be in its "up" state when it transmits from transducer 12A to transducer 12B, without regard to whether the fluid flows in direction 12A–12B or direction 12B–12A. The latter directions will, however, affect the sign of the flow rate as determined by the flowmeter of the invention.

Because the scientific basis for measurements that are based on differences between the up and down time-of-flight values of the ultrasonic waves are well-known to those skilled in the art, this scientific basis will not be described in detail herein.

In order to accurately determine the difference between the time-of-flight values for the up and down states of the flowmeter, it is necessary to accurately measure the time-of-flight values for the up and down states thereof. The latter measurement, in turn, requires an accurate measurement of the time that elapses between a particular transition of the sampling signal and the corresponding zero crossing of the received signal. This measurement is complicated by the fact that the sampling signal has numerous transitions, and the fact that the received signal has numerous zero crossings, thereby creating the possibility of phase ambiguities. It is also complicated by the fact that the time that is required for ultrasonic waves to propagate between the transmitting transducer and the receiving transducer is large in relation to the periods of the transmitted and received signals.

In accordance with the present invention there is provided an improved apparatus and method for making the above-described measurements accurately with circuitry and steps that do not require the presence of circuit devices that require large numbers of bits, fast rise times, close component matching or other special characteristics that add to the cost thereof. As will be explained more fully presently, this is accomplished by measuring the time-of-flight time by adding together the count values associated with a multi-component signal the components of which are so related to one another that high accuracy is achieved without the use of expensive or specialized circuit devices. The structure of this multi-component signal is most easily understood with reference to the waveform diagrams of FIGS. 5A, 5B, 6A and 6B.

Referring to FIG. 5A, there is shown a programmable reference signal $W_{REF}$ which defines the time window within which the zero crossings of the received signals are timed with respect to corresponding transitions of the sampling signal. Advantageously, this window begins with a reference transition $T_R$ (also referred to as an enable count or ENCNT signal) that occurs a controllable time after a predetermined one of the transitions of drive signal $S_{TR}$. In the present example, this is the first transition of the drive signal and is labelled synchronous start or SYNST in both FIGS. 4A and 5A. The word "synchronous" is used to distinguish this signal from an asynchronous start signal, such as that which might be initiated by a user at any time in order to request that a flow measurement be performed. It will be understood that the difference in the occurrence times of the asynchronous and synchronous start signals are very small and occupy only the time necessary to bring the drive signal into synchronism with the other clock signals of the flowmeter.

In the method of the invention the occurrence time of reference transition $T_R$ comprises the time, after the beginning of a drive burst, at which timing data, in the form of count values, begins to be taken for the zero crossings of the received signal. In the preferred embodiment, the occurrence time of the reference transition is expressed as the sum of a fixed component WF, which is selected and set to an accurately known value at the time of manufacture, and a variable component WV which may change frequently during the operation of the flowmeter. Fixed component WF is dependent upon the dimensions of pipe P and the type of fluid to be measured, and will ordinarily be comparable to the greater part of the time necessary for an ultrasonic wave to propagate from the transmitting transducer to the receiving transducer. Variable reference signal component WV is preferably small in relation to fixed reference signal component WF, and is expressed as an eight bit number that specifies the number of fixed time intervals of accurately known duration, hereinafter referred to as window counts, that must be added to fixed component WF to specify the position of reference transition $T_R$ with respect to the transmitted burst. Thus, by merely keeping track of an eight bit number, the window count, the flowmeter is able to avoid phase ambiguities by keeping accurate track of the time displacement between the zero crossings of the received signal and the reference transition with a high degree of accuracy.

Reference transition $T_R$ also comprises a local time reference with respect to which a synchronized sampling signal or SAMPSYN is generated for use in measuring the occurrence times of the zero crossings of the received signal. This sampling signal has a period equal to the period of the received signal, and includes a set of sampling windows which correspond to respective zero crossings of the received signal. These sampling windows include sampling transitions, such as SAMSYN1, SAMSYN2, etc., for use in timing respective zero crossings of the received signal. Because the positions of these sampling transitions with respect to the reference transition are known with high accuracy, the positions of the zero crossings with respect to synchronous start signal SYNST is also known with high accuracy, even though the reference transition is free to shift with respect to the drive signal as a result of changes in the number of window counts making up signal WV.

The relationship between the sampling transitions of the sampling signal and the zero crossings of the received signal will now be described with reference to FIGS. 6A and 6B. In FIG. 6A, the approximately steady state portion of the received signal is shown with an expanded time scale. FIG. 6B shows a number of sampling transitions, such as SAMPSYN1, SAMPSYN2, etc., together with the corresponding zero crossings, such as ZDET1, ZDET2, etc., of the received signal. The timing of the latter with respect to the corresponding sampling transitions is measured by counting the number of high frequency clock pulses (too numerous to show in FIG. 6B) which occur between the sampling transitions and the corresponding zero crossings. The time occurring between transition SAMPSYN1 and ZDET1, for example, is specified by a number of counts UPCNT1 equal to the number of high frequency clock pulses counted therebetween when the flowmeter is in its UP state. The counts associated with subsequent sampling transitions and zero crossings are similarly equal to UPCNT2, UPCNT3, etc. A similar sequence of count values (not shown) are generated during the down state of the flowmeter and are referred to as DNCNT1, DNCNT2, etc.

The resolution with which the zero crossings of the received signal may be timed is related to the frequency of the high frequency clock signal. When used as a spirometer, with transducers that have a resonant frequency of 40 KHz, the period of the sampling signal may be 25 µs and the high frequency clock may have a frequency of 100 MHz or even higher. In such a spirometer, the sampling window may occupy 10 µs, less than one-half of the period of the sampling signal, and still have a capacity of 1024 counts at 100 MHz. If, for the sake of commensurability with the reference signal only 1000 of these counts are actually used, the sampling signal will provide a resolution of 10 ns, a resolution more than adequate for use in spirometers. The relationships between these exemplary frequencies and numerical values is illustrated in FIG. 7B, in which there are shown a few representative up state sampling windows S1U and S2U. Similar sets of sampling windows (not shown) will be understood to exist for the down state of the flowmeter.

The above-mentioned commensurability of the sampling windows and the reference signal is manifested as an integer number (or integer fraction) relationship between the maximum usable number of counts included in the sampling windows and the number of counts that corresponds to one of the window counts or time intervals of the reference window signal. If, as in the preferred embodiment, the time intervals of the reference signal have a duration of 1 µs, i.e., a duration corresponding to one-tenth of the number of clock pulses that are included in the sampling windows, then each window count of the reference window signal will correspond to 100 counts of the sampling signal. As a result, sets of 100 high frequency clock counts may be exchanged between the window counts and the sample counts without a loss of high resolution sampling data. This, in turn, allows the position of the reference transition, or boundary of the reference window, to be changed with respect to the next burst of drive pulses, as necessary to accommodate changes in flow rate and/or temperature, without allowing the zero crossings of the received signal to escape from the respective sampling windows of the sampling signal, thereby eliminating phase ambiguities.

The above-described interchangeability of window counts and sampling counts is most easily understood with reference to the tables shown in FIGS. 8A and 8B. Referring first to FIG. 8A there are shown three combinations of window counts and sampling counts that correspond to a time-of-flight value (e.g., SYNST-to-ZDET1 time) of 131 µs. (In this example, for the sake of clarity, the fixed window is assumed to include zero window counts.) From these combinations it will be seen that, for a window count of 126 (WV=126 µs) the sampling count will have a value of 500, indicating that the zero crossing is in the middle of its sampling window. Increasing the window count to 127 or decreasing it to 125 may be offset, however, by causing the sampling count to decrease to 400, or increase to 600, respectively, although, in such cases, the zero crossing will no longer be in the middle of its sampling window. Thus, counts may be, in effect, shifted or interchanged between the reference and sampling signals without changing the total time-of-flight time of an ultrasonic wave.

In accordance with one feature of the invention, this interchangeability is used to shift the position of the reference window as necessary to prevent a zero crossing from escaping from its respective sampling window, in spite of changes in flow rate, without affecting the accuracy with which the time-of-flight of that zero crossing may be measured, thereby minimizing phase ambiguities. In the preferred embodiment, it is also used to maintain the zero crossings of interest within a predetermined range of counts that is centered on or at least includes the mid-count value of the corresponding sampling windows. If, for example, as shown in FIG. 8B, the sample count has a value of 800, indicating that the zero crossing is approaching the 1000 count boundary of the sampling window, the window count may be increased in a series of increments (1 increment per burst) so that the sample count is forced to take on a value of 500. Such adjustments may be made repeatedly during a series of measurements to assure that a variety of different time-of-flight values all have sample count values which are not substantially different from 500. In this way, the sampling windows are, in effect, shifted as necessary to assure that all zero crossings are measured both with a high resolution, and over a wide range of time values, even though the maximum number of sample counts is limited to 1000.

In the preferred embodiment, a sample count is regarded as being within acceptable limits, i.e., within a count range that does not call for a shifting of the reference transition, as long as it has a value which is between 350 and 650, as shown in FIG. 7B. When the sample count varies outside of this target range, the reference transition is shifted as necessary to return it to a value within that range. Because transmission—reception events occur every 10 ms, or even more frequently, and because the flow rate of an inhaled or exhaled gas cannot change substantially in 10 ms, this shifting process effectively prevents zero crossing from escaping from their respective sampling windows in spite of substantial changes in flow rate. Thus, while the sampling windows and the zero crossings are not maintained in a rigid phase lock relationship, they are maintained in a loose tracking relationship that is equally effective in preventing the sampling transitions and zero crossings from becoming uncorrelated with one another.

Because of slight differences from transducer to transducer, the optimum position of the reference transition during the up state of the transducer may not be the same as the optimum position for the reference transition during the down state of the transducer. In accordance with the invention these differences, among others, are dealt with by providing for separate, independently adjustable reference signals for the up and down states of the flowmeter. This independent adjustment is shown in FIG. 7A. In FIG. 7A the maximum range, $WV_{MAX}$, of the variable component of the reference window signal includes 256 window count values, each corresponding to 1 μs, with a mid-count value, $WV_{MAX}/2$, or 127. It will be understood that the number 256 is an exemplary value that assumes the use of an eight bit window counter. The reference transitions of the up and down states of the flowmeter, while ideally equal to each other and to 127, may have window count values WUP and WDN which are different from one another and from 127. The manner in which these values are produced and used will be discussed later in connection with the flow charts of FIGS. 17–22.

Figure 10:
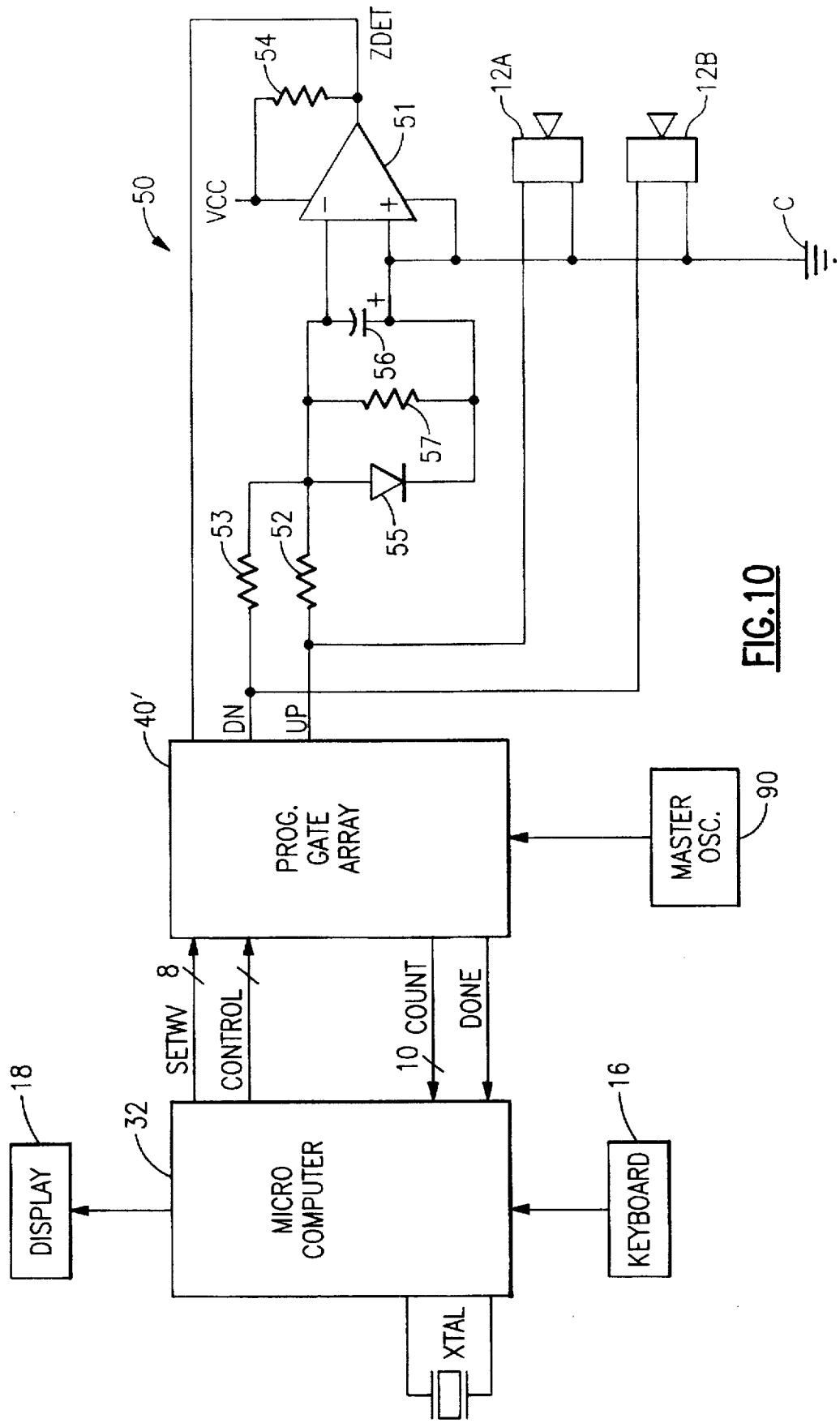
FIG. 10 shows the commercial flowmeter of FIG. 1.

Referring to FIGS. 9 and 10, there are shown two different representations of a flowmeter that is constructed in accordance with the apparatus of the invention, and that is suitable for use in practicing the method of the invention. FIG. 9 shows the flowmeter in block-schematic form in order to illustrate the major circuit subsystems thereof. FIG. 10, on the other hand, shows the preferred or commercial embodiment of the flowmeter, most of hardwired circuitry of the embodiment of FIG. 9 is incorporated into a programmable gate array (PGA) or application specific integrated circuit (ASIC) 40'. A specific example of the electrical circuitry which may be included in the blocks or PGA of FIGS. 9 and 10 will be discussed later in connection with FIGS. 11 and 12.

Referring first to FIG. 9, flowmeter 15 will be seen to include a programmable control portion 30 and a hardwired (non-programmable) control portion 40. Programmable portion 30 preferably comprises a microcomputer 32 together with a read/write data memory or RAM 34, a read only program memory or ROM 36, and a number of I/O ports (not shown) through which microcomputer 32 may input and output control and data signals to and from keyboard 16, display 18, hardwired control circuit 40, and transducers 12A and 12B. Hardwired control circuit 40 preferably includes digital and analog circuitry which cooperates with microcomputer 32 in controlling and taking data from transducers 12A and 12B.

In practice, the allocation of functions between circuit portions 30 and 40 is a matter of convenience and cost, rather than of principle. This is because microcomputer 32 is, with suitable changes in its stored program, able to take over more or fewer of the functions of hardwired circuit 40, with no substantial change in the overall operation of flowmeter 15. As a result, it will be understood that hardware and software implementations of otherwise similar functions are equivalent to one another for purposes of the present invention.

Generally speaking, microcomputer 32 of FIG. 9 is programmed to perform operations such as addition/subtraction, multiplication/division, sequence control and statistical evaluation, that are most efficiently performed by software. Conversely, hardwired circuit 40 is arranged to perform simple operations, such as high speed sampling or counting, AND-ing, etc. that are most efficiently performed by off the shelf digital or analog integrated circuits. To avoid the complexities of continually cross-referencing hardware and software figures, however, the flowmeter will first be described first with reference to its hardware and then with reference to its software, with only such cross-references there between as is necessary for the sake of clarity.

In the embodiment of FIG. 9, control circuit 40 includes an up/down transmit control circuit 45 for alternately applying bursts of drive pulses to transducers 12A and 12B, and thereby establishing the up and down states of the flowmeter. Control circuit 40 also includes a receiver or zero crossing detecting circuit 50 for alternately receiving ultrasonic waves that have propagated across pipe P (not shown) during respective drive bursts. Advantageously, as will be described later, transmitter circuit 45 and receiver circuit 50, share a circuit common or ground connection C and include no separate transmit or receive amplifiers, no waveshaping filters, and no reversing switches such as those used by the prior art.

Control circuit 40 also includes reference window and sampling logic networks 60 and 70, respectively. These networks serve to generate the earlier described reference and sampling signals, and thereby establish the signal framework that allows the time-of-flight values of the ultrasonic waves of the up and down states of the flowmeter to be accurately measured. Also included in control circuit 40 is a counter circuit 80 and a count latch circuit 85, which together serve to make and store a high resolution measurement of the time-of-flight values of the ultrasonic waves and make them available to microcomputer 32 so that the latter can calculate the desired flow parameter, e.g., flow rate, total volume of flow, etc. Finally, control circuit 40 includes a master oscillator 90 and a clock generating circuit 95 for generating the timing and synchronizing signals used by the remaining circuitry of control circuit 40.

In the embodiment of FIG. 9 a measurement sequence begins when microcomputer 32 generates a START signal either in response to an instruction of its stored program or in response to a keyboard initiated measurement command. As is most clearly shown in FIG. 11, the START command is delayed briefly by D-type flip-flops 102 and 104 to bring it into synch with the transitions of the 40 KHz and 1 MHz clock signals, the latter themselves being in synch by virtue of their common generation within clock generating circuit 95. The result is a version of the START signal, SYNST, which is in synch with the remaining clock signals and which also coincides with the beginning of a drive burst.

Figure 11:
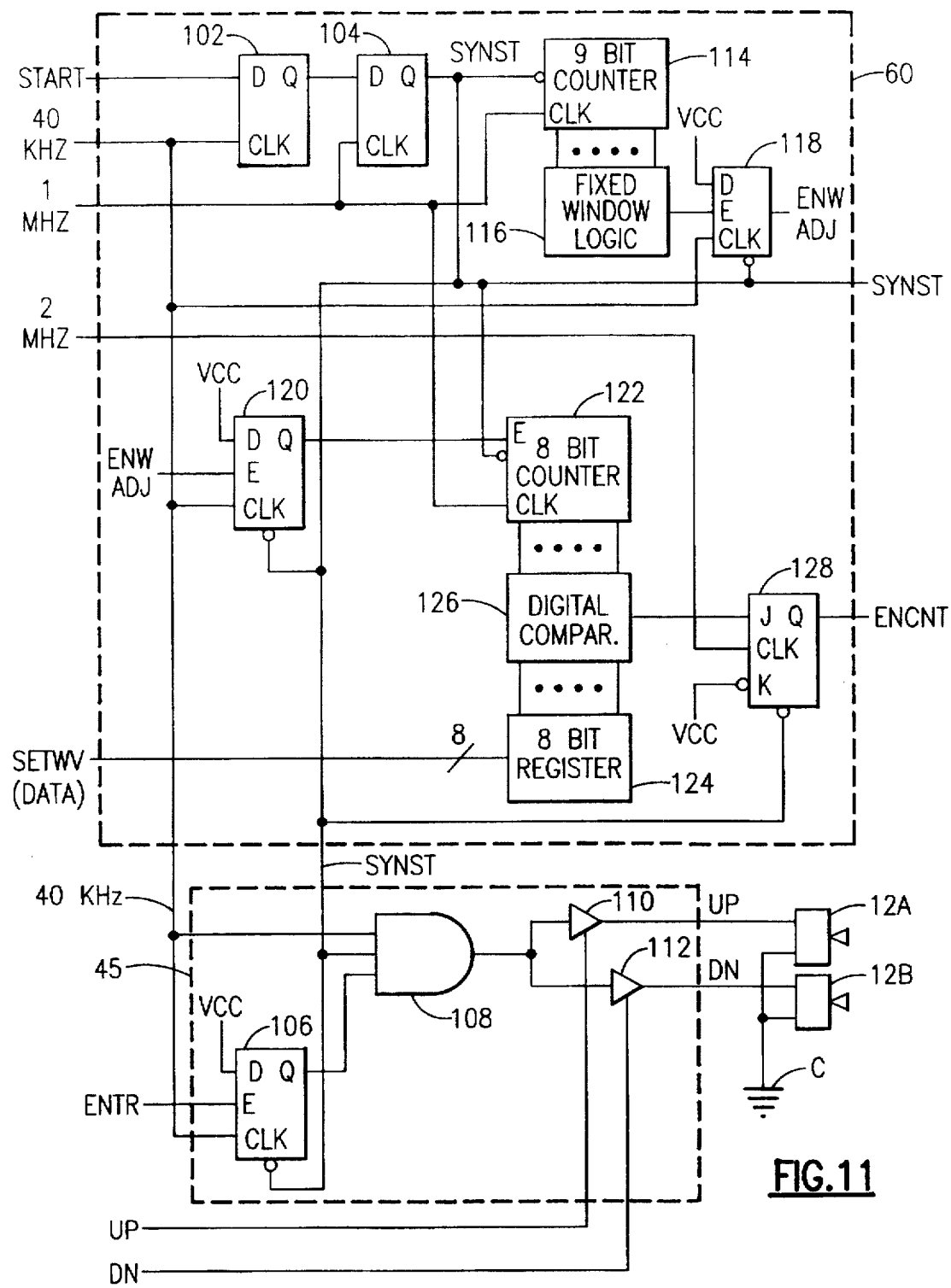
FIGS. 11 and 12 are logic diagrams of selected parts of the circuitry shown in FIG. 9.

The coincidence of the SYNST signal with the beginning of a drive burst results from the application of the SYNST signal to D flip-flops 106 of up/down control circuit 45, as shown in FIG. 11. Coincidence with the 40 KHz drive signal is assured by using the latter signal to clock flip-flop 106, and by gating the output of flip-flop 106 with the SYNST and 40 KHz drive signals with a gate 108.

In accordance with the invention, the output signal of gate 108 may be used to directly drive transducer 12A or 12B, depending upon which of two tri-state buffers 110 and 112 is selected, provided that up/down control circuit 45 (and flip-flop 106) is provided with an enable transmit signal ENTR by microcomputer 32, as shown in FIGS. 9 and 11. Which of transducers 12A and 12B actually transmits will depend upon the states of up and down signals UP and DN, which are also provided by microcomputer 32, as shown in FIGS. 9 and 11. Thus, provided that signal ENTR is enabling, gate 108 will begin applying 40 KHz drive signal $S_{TR}$ to the selected transducer, by means of the respective tri-state buffer, when the SYNST signal occurs.

It should be noted that the UP and DN drive signals are applied to transducers 12A and 12B by (rather than through) tri-state buffers 110 and 112. This does not mean, however, that tri-state buffers 110 and 112 are used as output or drive amplifiers, in spite of the fact that they can produce a higher output current than gate 108. This is because any gain that is associated with this higher output current is incidental to the real function of buffers 110 and 112, namely: to combine the desired on/off switching action in conjunction with desirable source-load impedance relationships and to provide high impedance off state. But for the desirability of the latter, transducers 12A and 12B could be connected directly to the output of gate 108. (More accurately, transducers 12A and 12B could be connected directly to the outputs of two respective logic devices, one of which serves the function of devices 108 and 110 and the other of which serves the function of devices 108 and 112.) This is because the resonant character of transducers 12A and 12B allows them to be driven by an amount of power that is within the power handling capacity of ordinary off the shelf logic devices such as gate 108.

The real significance of the multi-state properties of buffers 110 and 112 is most easily understood with reference to the fragmentary schematic diagram of FIG. 9A, which shows the transient circuitry in a simplified and redrawn form. In FIG. 9A, when buffer 110 is in its active or drive state, it will have a low output impedance, without regard to whether gate 108 is in its high or its low state, while the output impedance of buffer 112 will be so high as to be negligible. Similarly, when buffer 112 is in its active or drive state, it will have a low output impedance without regard to whether gate 108 is in its high state or its low state, while the output impedance of buffer 110 will be so high as to be negligible. When neither buffer is in its active state, i.e., when comparator 51 is in its receiving state, however, both buffers will have high input impedances, thereby effectively connecting the input of comparator 51 across the output of the receiving transducer. It will therefore be seen that each transmitting traducer is driven from a low impedance source (buffer 110 or 112) while each receiving transducer drives into a high impedance load (buffers 110 and 112 and comparator 51). It is this advantageous impedance relationship (rather than any incidental gain that may be introduced by buffers 110 and 112 or by comparator 51), that underlies the previously stated fact that the driver and receiver circuits of the invention do not require drive amplifiers or preamplifiers, but instead are directly coupled to the transducers.

The fullest benefit of using two tri-state buffers to control the transmission and reception of transducers 12A and 12B will be realized if buffers 110 and 112 are realized as integrated circuits which are fabricated at the same time, and which are on the same die. This is because the latter conditions assure that buffers 110 and 112 are identical to one another, for all practical purposes, in all significant respects. The high output impedances exhibited by buffers 110 and 112 during the receiving state of the transducers, for example, assures that the output leakage currents of these buffers cannot differentially affect comparator 51 and introduce errors into ZDET. Similarly, whatever the temperature drift characteristics of buffers 110 and 112, these characteristics will be virtually identical, thereby preventing the temperature of buffers 110 and 112 from introducing errors into ZDET. Finally, since the resistance of resistors 52 and 53 and the output resistances of transducers 12A and 12B are both relatively small in comparison with the output resistances of buffers 110 and 112, insubstantial differences between resistors 52 and 53 and/or between transducers 12A and 12B also have little effect on ZDET. As a result, the driver/receiver circuitry of FIG. 9A provides, at surprisingly low cost, and with surprisingly ordinary types of components, a level of accuracy and repeatability which is comparable to or exceeds that of more expensive and more complex driver/receiver circuits.

To the end that the fixed component WF of the reference signal may be introduced, reference signal generating network 60 is provided with a 9 bit counter 114, which is connected to start counting 1 MHz clock pulses upon the occurrence of the SYNST signal. The duration of fixed component WF is determined by the number of 1 MHz clock pulses (fixed window counts each having a duration of 1 µS) that must be counted before fixed component WF terminates and variable component WV begins. The latter number is, in turn, determined by the connections of logic devices within fixed window logic network 116. These connections are preferably established during manufacture, based on the use to which the flowmeter will be put and the fluid with which it will be used, and not changed thereafter. There is no reason in principle, however, why the duration of fixed component WF could not be made adjustable, under the control of microcomputer 32, as will be described presently in connection with counter 122 and register 124.

When fixed reference signal component WF terminates, counter 114 and fixed delay logic 116 enable a D flip-flop 118 to generate an enable window adjust signal, ENWADJ. The latter signal is used by the remaining circuitry of reference signal generating network 60 to begin variable reference signal component WV. More particularly, signal ENWADJ is applied to a variable window control circuit that includes D flip-flop 120, 8 bit counter 122, 8 bit register 124, digital comparator 126 and D flip-flop 128.

The duration of the variable component WV of the reference signal is set by microcomputer 32 by means of an 8 bit signal, SETWV, which is stored in 8 bit register 124. Signal SETWV specifies the number of window counts, each having a 1 µS duration, which occur between the end of fixed component WF of the reference signal and the occurrence of the ENCNT or reference transition thereof. When the ENWADJ signal occurs, it enables flip-flop 120 which, in turn, enables 8 bit counter 122 to begin counting 1 MHz clock pulses. When the number of counted pulses equals that specified by register 124, digital comparator 126 causes J–K flip-flop 128 to output the ENCNT signal in synch with the 2 MHz clock signal. With the occurrence of the latter signal, the sampling of the received signal is begun by sampling circuit 70, as will now be described in connection with FIG. 12.

Figure 12:
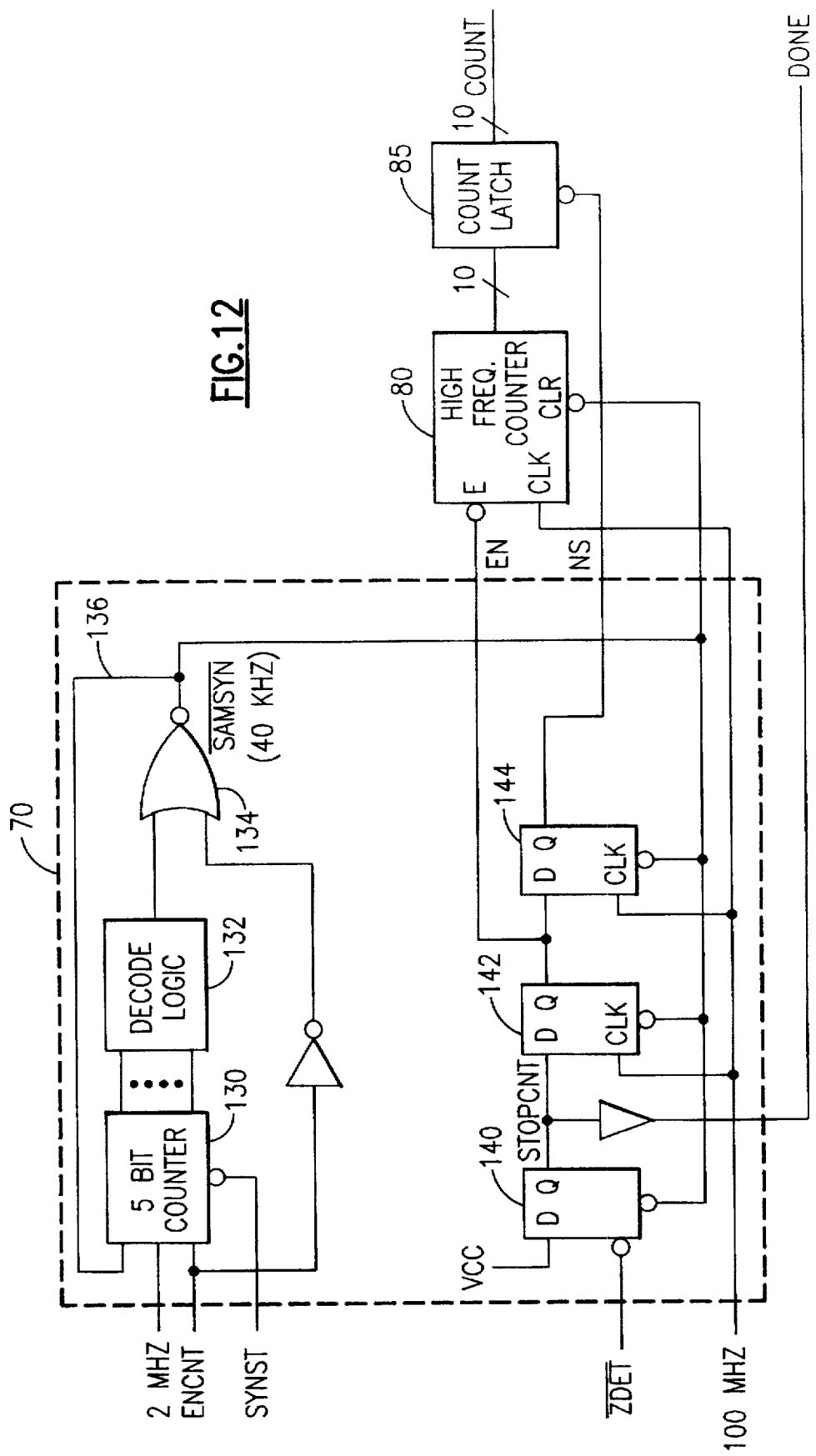

Referring to FIG. 12, there is shown the circuitry which generates a sampling signal SAMSYN having a plurality of sampling transitions for use in timing respective zero crossings of the received signal. In accordance with the invention, this sampling signal has a period that is equal to that of the 40 KHz drive signal, but has a phase position that is independent of the drive signal. Instead, the phase position of the sampling signal is set by reference transition ENCNT, as described earlier in connection with FIG. 6B. In the embodiment of FIG. 12 the 40 KHz sampling signal is produced by dividing the frequency of the 2 MHz clock signal by 50, beginning at the time of the occurrence of the ENCNT signal or reference transition. In the circuit of FIG. 12 this division is performed by 5 bit counter 130, in conjunction with a decode logic network 132 and OR gate 134 and a feedback line 136, counter 130 being cleared via line 136 after each 50 2 MHz clock periods. Since both the drive signal and the sampling signal are generated in generally the same way from the same 2 MHz clock, they necessarily have the same frequency. Being initiated by different, unrelated transitions, however, the phase positions thereof will be independent of one another.

During operation, each sampling event begins when a transition of the sampling signal, such as SAMPSYN1, clears counter 80 and thereby causes it to begin counting the number of 100 MHz clock pulses applied thereto. This counting continues during the time that the output of receiver network 50, ZDET, is in its 1 state, i.e., when the received AC signal is in its negative half cycle. When this AC signal undergoes a positive going zero crossing, ZDET undergoes a transition to its 0 state, causing flip-flops 140 to generate a stop count signal STOPCNT which, on the occurrence of the next 100 MHz clock pulse, stops the counting activity of counter 80 by removing the enable signal therefrom.

The STOPCNT signal is preferably applied to counter 80 via a flip-flop 142 which assures synch with the 100 MHz clock and which serves to latch counter 80 in its disabled state until it and flip-flop 140 are cleared by the next transition of sampling signal SAMSYN. A further flip-flop 144 may be provided to delay, until the next occurring 100 MHz clock pulse, the loading of the count value from counter 80 into latch 85, thereby assuring that latch 85 is loaded with a stable count value. The STOPCNT signal may also be used to generate the signal, DONE, which signals to microcomputer 32 that a new sample count value is available.

In view of the foregoing, it will be seen that counter 80 counts, at a 100 MHz rate (higher if desired), between each sampling transition and the next occurring transition of ZDET, thereby providing a high resolution (10 ns) measure of the time difference between these transitions. Since, as explained earlier, the occurrence time of the sampling transition is itself known with high precision (from the occurrence time of the reference transition), it will also be seen that the output of counter 80 allows the total time between SYNST and the zero crossing of the received signal to be determined with a resolution of 10 ns. Advantageously, the rise times of the circuits of the reference signal generating circuit 60 do not affect this resolution because these same circuits are used in the taking of all sample count values, and because all fluid parameter measurements are based on differences between sample count values, thereby assuring that the effect of these rise times cancels out.

The above-described sample taking procedure is repeated with a period of 25 µs because of the 40 KHz repetition rate of the sampling signal. As a result, sample count values such as UPCNT1, UPCNT2, etc. (or DNCNT1, DNCNT2, etc.) are produced with a period of 25 µs. Such sample count values will continue to be generated so long as 5 bit counter 130 remains enabled by enable count signal ENCNT, i.e., during the reference window, and will stop being generated at the end of the reference window. In embodiments, such as that shown in FIG. 11, this stoppage is brought about by the clearing of flip-flop 128 by the SYNST signal at the beginning of the next drive burst. More generally, however, the reference window may be terminated, at any desired time, by allowing microcomputer 32 to clear flip-flop 128 in accordance with any set of conditions specified by its stored program. Enable count signal ENCNT may, for example, be cleared after a particular number of sample counts, such as 8, have been read by microcomputer 32. Embodiments of the latter type have the advantage that they allow the flowmeter to "settle down" between drive bursts. Embodiments of the latter type will be referred to as including or making use of the "squelch" feature of the invention.

Returning to FIGS. 9 and 10, there will now be described the operation of the ultrasonic frequency circuitry with which the above-described high frequency circuitry operates. This ultrasonic frequency circuitry includes transmit control circuit 45, which was described earlier in connection with FIGS. 9, 9A and 11, and receive circuit 50. By comparison with the receive circuits known prior to the present invention receive circuit 50 is surprisingly small, simple and inexpensive, and yet provides a high common mode rejection. More particularly, receiver circuit 50 includes only an open-collector comparator 51, two input resistors 52 and 53, a pull-up resistor 54, an anti-saturation diode 55 and a high frequency bypass capacitor 56. Significantly, receiver circuit 50 like transmit circuit 45 includes no circuit elements which require special characteristics, such as unusually fast rise times, narrow tolerances or close component matching. Comparator 51 may even comprise an inexpensive Model LF311 comparator. As will be explained more fully presently, this is because the use of transmit and receive circuits that are directly coupled to high Q transducers, that use no polarity reversing switches, and that use substantially the same circuitry for the UP and DN states make more complex and costly circuitry unnecessary.

When the flowmeter is in its up state, AND gate 108 and tri-state buffer 110 of FIG. 11 apply the 40 KHz drive signal directly between transducer 12A and common ground C. Since transducer 12A is resonant at this frequency, it receives all of the power necessary to transmit the desired ultrasonic waves. Under this condition transducer 12B generates no ultrasonic waves because its tri-state buffer 112 is in its high impedance state. This condition continues until the end of the transmit burst, when gate 108 is returned to its low state by signal ENTR. During the drive burst, drive power is supplied to comparator 51 via resistor 52, but has no adverse effect on the flowmeter. This is, in part, because most of this drive is shunted past comparator 51 by diode 55 and, in part, by the fact that the state of the reference window signal prevents the flowmeter from taking any sample data at this time.

Later, after the drive burst has had time to propagate through the fluid and excite transducer 12B, the latter transducer begins to generate received signal $S_{RC}$, as shown in FIG. 4B. When the amplitude of the received signal becomes high enough, the positive going zero crossings thereof cause the output of comparator 51 to undergo the negative going transitions that comprise zero crossing detect signal ZDET. The time occupied by this negative going transition is sufficiently short to permit its use in timing the zero crossings of the received signal, notwithstanding the low cost of comparator 51. This is possible, in spite of the fact that the positive going transition of the comparator takes too long to be used to time zero crossings, because the invention assures that only positive going zero crossings of the received signal are used in the taking of sample data. As explained earlier, the timing of reference transition ENCNT is preferably chosen so that it occurs after the occurrence of the first few of the zero crossings, thereby assuring that sample data is taken only after the received signal has had a chance to build up to a usable value.

After the desired up state data has been taken, the flowmeter is ready for operation in its down state. Such operation is initiated and conducted in the same manner as for the up state, except that the states of signals UP and DN of FIG. 11 are reversed, causing tri-state buffer 110 rather than 112 to be in its high impedance state. Under these conditions, it will be seen that transducer 12B receives, from the 40 KHz source and gate 108, exactly the same drive signal that transducer 12A received. It will also be seen that, when the transmitted signal is received by then receiving transducer 12A, it is received by the same receive circuitry (except that it is applied through resistor 52 rather than resistor 53) and in particular by the same zero crossing detecting comparator 51. As a result, even if comparator 51 has properties, such as input offset and drift that can cause errors, the fact that it is used in the taking of two count values that will be subtracted from one another assures that the effect of such errors will cancel out.

In summary, the transmit and receive circuits of the invention, including the associated high Q transducers, have the advantage that they are highly frequency selective and can therefore be used without waveshaping (harmonic) filters, or AC coupling networks, and without separate drive or receive amplifiers. They can also be used without the different power supply voltages that are usually used in circuits that include both analog and digital circuit devices, and without polarity reversing switches. In spite of the simplicity and low cost that is associated with the absence of these circuits, the transmit and receive circuits of the invention provide high resolution, highly stable and repeatable data, with high common mode noise rejection, to a degree which is comparable to or better than the more complex and expensive transmitter/receiver circuits known heretofore.

The Flow Determination Process

Referring to FIG. 13, there are shown the equations 1 through 8 which are preferably used to determine the rate of fluid flow from the up and down count values, MUPCNT and MDNCNT, that are measured by the above-described circuitry when the flowmeter and the fluid of interest are at their nominal temperature, i.e., the temperature at which the transducers operate at their nominal resonant frequency. (Equations which include a correction for operation of the transducers at temperatures other than this nominal temperature will be described later in connection with FIGS. 14, 18A and 18B). In accordance with the present invention, these measured count values are based not on the count values of single zero crossings of the received signal, but rather on the average of the count values for at least selected ones of the zero crossings that occur during the reference window. As shown in equations 5 and 6, for example, measured upcount and measured downcount values MUPCNT and MDNCNT, respectively, are calculated as the sum of eight UPCNT and DNCNT values divided by eight, although numbers other than eight could also be used. Using these averaged count values to determine flow has the advantage that it reduces the effect of high frequency noise or jitter, and of quantization error, thereby assuring a more stable and repeatable flow value. This is in spite of the fact that, in principle at least, the count values measured for all zero crossings should be identical.

Once the averaged up and down counts have been measured, they are combined with timing data from their respective reference signals to produce total upcount and total downcount values TUPCNT and TDNCNT values, respectively, as shown in equations 3 and 4 of FIG. 13. Total upcount TUPCNT, for example, is equal to the sum of measured upcount value MUPCNT and a count value that depends on the occurrence time of the reference transition WUP of the up state. The latter value is equal to the product of N, the fixed number of sample counts that correspond to a window count, and the number of window counts that preceed up state reference transition $WUP_{RUN}$. As explained earlier, the up and down state reference transitions in general have different values and, therefore, should be separately added to their respective sample count values if an accurate total count is to be produced. A further improvement in accuracy will result if the WUP and WDN values of the running state of the flowmeter are corrected for the difference between these values and the corresponding values taken during calibration of the flowmeter at a known rate of flow, $WUP_{CAL}$ and $WDN_{CAL}$.

Figure 26A:
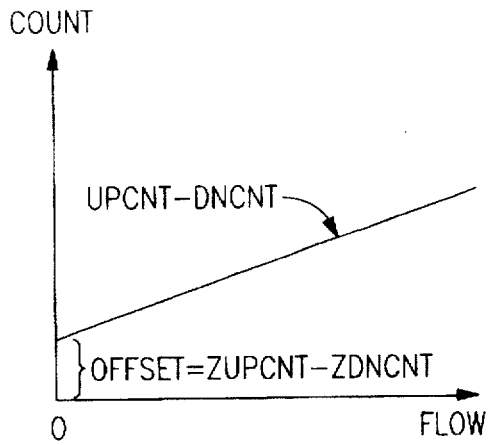
FIGS. 26A and 26B show count values plotted as a function of flow rate.

After the total upcount and total downcount values, TUPCNT and TDNCNT, respectively, have been determined, the final rate of flow is determined from the difference therebetween, as shown in equation (1) of FIG. 13. This difference is preferably adjusted to take into account the zero offset of the flowmeter, (ZUPCNT - ZDNCNT), as measured during calibration at zero flow, as shown in FIG. 26A. The adjusted difference is then multiplied by a calibration coefficient $K_c$ to determine the final flow rate value. The magnitude of the latter coefficient is the constant of proportionality which relates total flow and total count, as shown in equation 2 of FIG. 13 and FIG. 26B. As will be explained later, these total flow and total count values are preferably values that are measured during the calibration of the flowmeter under conditions of non-zero flow. It will, therefore be seen that, unlike prior art flowmeters, which determine flow by calculations using complex equations that are derived on the basis of theoretical considerations, the flowmeter of the invention determines flow using very simple equations which are based on actual measurements taken at known flow rates (during calibration) and actual measurements taken at unknown flow rates (during measuring runs).

To the end that flowmeter 15 may provide flow data at a data rate that is high enough to accurately track flows that change relatively rapidly, the present invention preferably makes use of a technique that will hereinafter be referred to as "interleaved sampling". As used herein, this means that each new upcount or downcount value is used to calculate a new flow rate, without regard to the order in which the count values are measured. In other words, each upcount value is used in conjunction with both the preceding and following downcount value (and vice versa) to calculate a new flow value, as shown in FIG. 15. This interleaving of the up and down sequence measurements has the effect of substantially doubling the data throughput rate of the flowmeter, because it assures that the number of flow values is substantially equal to the total number of up and down count measurements, rather than the total number of pairs of such measurements. Thus, as shown in FIG. 15, even though up sequence events, such as U1, U2, etc., and down sequence events, such as D1, D2, etc., each occur every 20 ms, new flow values FLOW1, FLOW2, etc. become available every 10 ms.

Temperature Correction

In accordance with an important feature of the present invention, provision is made for correcting temperature related errors in flow rate. More particularly, provision is made for the effect of errors which exist as a result of differences between the actual operating temperatures of the transducers and the temperatures at which the transducers operate at their nominal resonant frequencies, i.e., their nominal operating temperature.

Advantageously, the present invention is able to correct for the effect of temperature without requiring either a dedicated temperature measuring transducer, such as a thermistor, or the dedicated temperature determining circuitry that is used therewith. This ability is based on the recognition that the temperature characteristic of the transducers may be applied to a series of count values to determine the magnitude of the needed temperature correction. This recognition is based, in part, on the fact that the resonant frequency of high Q transducers, such as 12A and 12B, varies substantially linearly with temperature. Stated differently, transducers such as 12A and 12B operate precisely at their nominal resonant frequency of 40 KHz only when the temperature thereof are at their nominal temperature, usually 25° c. At higher and lower temperatures the transducers will resonate at higher and lower frequencies that are linearly related to the difference between their actual and nominal temperatures. This recognition is also base, in part, on the recognition that the frequencies of the reference and sampling signals are substantially independent of temperature. Together, these properties allow the temperature of the transducers to be inferred from particular patterns of change in the relative phase positions of the received signal and the sampling signal. These patterns of change, and the manner in which they are used, will now be described in conjunction with the equations of FIG. 14 and the waveforms of FIGS. 16A, 16B and 16C.

Figure 16A:
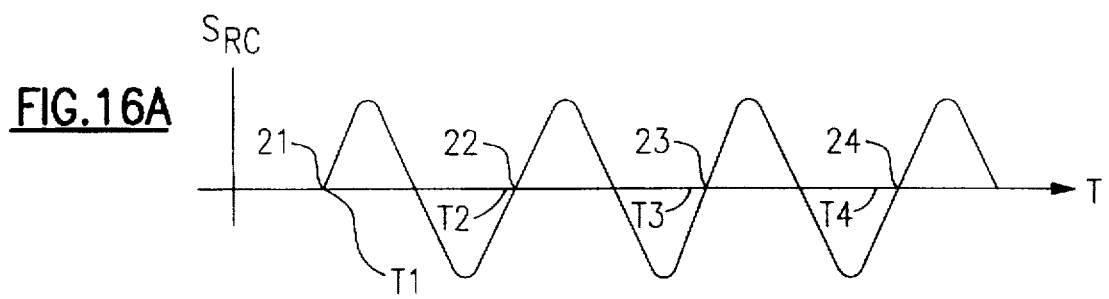
FIGS. 16A, 16B and 16C illustrate the effect of transducer temperature on the operation of the flowmeter of FIG. 1.
Figure 16B:
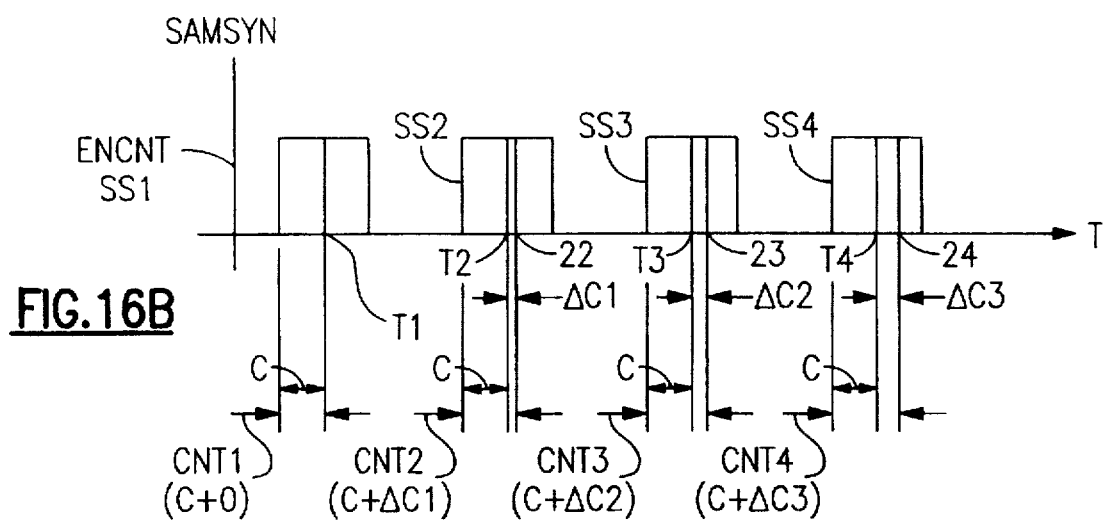

Referring first to FIGS. 16A and 16B, which are versions of FIGS. 6A and 6B that have been generalized to apply to both the up and down states of the flowmeter, there is shown the pattern of change in count values that develops when the resonant frequency of the transducers becomes less than its nominal frequency as a result of operation at a non-nominal temperature. In FIGS. 16A and 16B, it is assumed for the sake of discussion that the first count value CNT1 associated with zero crossing Z1 has a value exactly equal to C.

Because of its longer than nominal period, the next zero crossing Z2 of the received signal will occur later with respect to its corresponding sampling transition SS2 of the sampling signal than did zero crossing Z1. As a result CNT2 will be greater than CNT1 by an amount $\Delta C1$, i.e., CNT2 will be equal to count C plus a change in count $\Delta C$ that reflects the difference between the actual and nominal temperature of the transducer. This change in count will increase linearly for still later occurring zero crossings Z3 and Z4, resulting in count values CNT3 and CNT4 that differ from count C by change in count values $\Delta C2$ and $\Delta C3$ that also reflect the latter temperature difference.

Figure 16C:
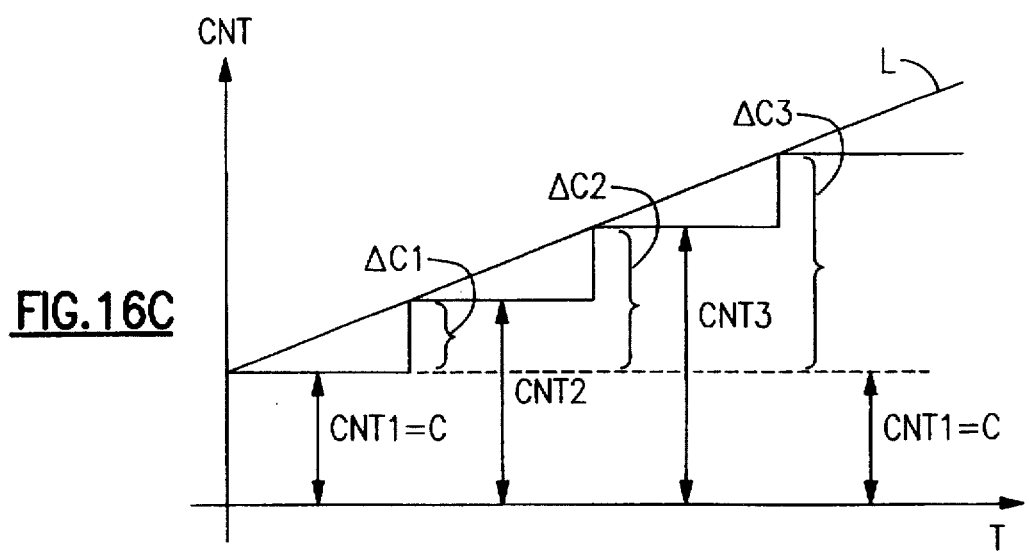

Referring to FIG. 16C, there is shown (with an exaggerated vertical scale) a representation of how the above-mentioned count values change as a function of time for a constant actual-nominal temperature difference. From FIG. 16C it will be seen that the measured count values increase linearly with time in a series of values that is bounded by a line segment (or envelope) L that forms an approximately constant angle with count value C, i.e., has a constant slope. In accordance with the invention it has been recognized that this slope is a function of temperature, and may be used quantitively to correct the sample count to eliminate the temperature related component thereof. As a result, a sequence of flow determinations may be corrected or normalized so that they may be compared as if they were all made with the transducers at a temperature equal to the nominal temperature thereof.

In the preferred embodiment, the desired temperature correction is made early in the flow determination process by correcting the average count values that are used in the flow calculation. This has the effect of subtracting, from the area under line L of FIG. 16C, an area equal to the area of wedge shaped region that lies between sloped line L and horizontal line C thereof. This subtraction is shown in equations (2) and (3) FIG. 14, wherein there is subtracted from each average count value, such as UPCNT, an average difference value, such as UPDIFF, that is calculated from the $\Delta C$ values of FIG. 16C in the manner shown in equation (4) of FIG. 14. That the second terms of equations (2) and (3) of FIG. 14 are based on an average of seven difference values, while the first terms thereof are based on an average of eight count values (assuming that 8 are used), results from the fact that eight count values define only seven difference values. For practical reasons, the second or difference terms of equations (2) and (3) of FIG. 14 are preferably multiplied by scaling factors $K_U$ and $K_D$, respectively, which are determined during calibration to take into account differences between transducers.

After the measured count values have been corrected for the effect of temperature, they may be distinguished from the respective uncorrected count values by the suffix <TC>, meaning "temperature-corrected". The corrected count values may then be used in variants of the equations shown in FIG. 13 to produce a temperature corrected flow value FLOW<TC>. The form of the temperature corrected flow equation is shown as equation (1) of FIG. 14.

The temperature correction of the invention may also be implemented at the end rather than the beginning of the flow determination process. The magnitude of this correction may, for example, calculated by software or measured by hardware, such as that shown in FIG. 29, stored until a flow calculation has been performed, and then applied as a scaling factor to correct that calculation for the effect of temperature. It will therefore be understood that the temperature correction process of the present invention is not restricted to hardware or software implementations, and may be applied either before or after the basic flow calculation has been performed.

In order to facilitate an understanding of the calibration process of the invention, there follows a summary of the flow determination process as a whole, including the steps used to start up the flowmeter and to determine the values of up and down window counts WUP and WDN. This process will now be described with reference to the flow charts of FIGS. 17 and 18. In FIGS. 17 and 18 there are shown flow charts of those parts of the stored program of the flowmeter that prepare the flowmeter for calibration. In particular, FIG. 17 shows the overall start up routine of the invention, and FIG. 18 shows a window adjust subroutine that may be executed repeatedly during the course thereof.

Referring first to FIG. 17, execution begins with a block 200, which calls for microcomputer 32 (often hereinafter referred to as "the computer" or "the processor") to set the up and down window counts WUP and WDN to assumed mid-range values of 127 each, 127 being approximately equal to one-half of 256. Block 200 also causes the processor to initialize up and down count values UPCNT and DNCNT to 0. Not shown is the magnitude of fixed window component WF, since this is ordinarily a constant that is set by hardware at the time of manufacture, based on the fluid to be measured and the dimensions of pipe P, and not changed thereafter.

After exiting block 200 the processor is directed to blocks 205–220. Together, these blocks cause the processor to fill each of an up array and a down array with 256 measured up and down count values. Once this has been done, block 225 causes the processor to calculate the averages of these sets of 256 values. This assures that the window adjustment process which follows is based on representative sets of measured values in which the effect of a few anomalous count values is minimized.

Once the averaged up and down count values have been calculated, the processor is directed to block 230. This block tests to determine if the averaged sample count values are each within 150 counts of the 500 count mid-range value of the 1000 count wide sampling window, i.e., are between 350 and 650. (A sample count of 500±150 is an exemplary target count range that assures that zero crossings of the received signal cannot easily occur outside of their respective sampling windows by assuming values less than 0 or greater than 1000). If both averaged count values are within this target range, it is known that the window counts of the reference signal have acceptable values, and the processor is directed to block 235 which causes it to begin executing the calibration routine that will be described in connection with FIGS. 21 and 24. If either averaged count value does not fall within this target range, it is known that a window count adjustment is called for, and the processor is directed to block 240 which causes it execute the window adjust routine of FIG. 18.

Referring to FIG. 18 there is shown the flow chart for the window adjust routine. On executing this routine the processor is directed to perform the sequence of comparisons indicated by blocks 245–260. Associated with the latter are adjustment blocks 265–280 which adjust the window counts by ±1 count each time that the associated comparison block indicates an out of limits count condition. As explained in connection with FIG. 8B, each change in window count has the effect of changing the respective sample count value by 100 counts and moving the same closer to being within the target range of 350–650. As a result, the up and down window counts will each get one count closer to acceptable values during each execution of routine 240.

On exiting window adjusting routine 240, the processor is directed back to block 205, which causes it to repeat the array filling, averaging and testing steps described in connection with FIG. 17. It will therefore be seen that the latter steps and adjusting routine 240 may have to be performed numerous times before the target range test of block 230 can be passed. When this test has been passed, however, it will be known that a stable, repeatable operating condition has been achieved and that the up and down window counts and the up and down sample count values are all in the desired relationship to one another and within acceptable limits.

For the sake of clarity, description of the calibration process of the invention will be deferred until after a description of the flow measurement process in connection with the flow chart of FIG. 19. It will therefore be understood that the following description of the flow measurement process is based on the assumption that all of the acceptability tests that are conducted during the calibration process have been passed, and that all constants that are to be determined during the calibration process have been determined.

Referring to FIG. 19, the flow measurement process of the invention begins with a block 295 which serves to provide the processor with a regular opportunity to stop the flow measurement process, if and when requested to do so by the user or the stored program. It then continues to block 297, which causes it to use up window count value WUP and then execute count or sampling routine 300 for the up state of the flowmeter. The steps of the latter routine are shown in the flow chart of FIG. 20 and represent the sequence of calculations necessary to determine the value called for by equation (2) of FIG. 14.

More particularly, sampling routine 300 includes a block 305 which causes the flowmeter to transmit an up state burst and count and store 8 (more or fewer can also be used) sample count values in the manner previously described. Block 310 then causes the processor to average these values, thereby producing the first term of equation (2). Thereafter, block 315 causes the processor to calculate the second term of equation (2), and block 320 combines these terms to produce the desired temperature corrected measured upcount value MUPCNT<TC>. Block 320 may be skipped if the temperature correction feature of the invention is not being used. In accordance with block 325, the resulting value is passed to the main program (FIG. 19), allowing execution of the latter to continue on to block 330.

Upon encountering block 330, the processor is directed to perform the flow calculation described previously in connection with equation (1) of FIG. 13 (On the first pass through block 330, a downcount of ZDNCNT is assumed since no corresponding downcount will then be available, but will be available on subsequent passes). When the calculation is completed, it will result in one of the flow measurement values shown in FIG. 15.

When a flow value has been output, the processor is directed to block 335, which causes it to determine if a window count adjustment is called for and, if necessary, to make the adjustment. This may be done in the manner described previously in connection with the window adjustment routine of FIG. 18. In this way, as a succession of flow measurements are made, the sample count values will be forced become and remain within the 350–650 to target count range, in spite of changes in the associated window count values. Such adjustments do not result in any loss of sample data because they are taken into account in the manner shown by equation (3) of FIG. 13.

As the flow measurement process continues the just described up state steps are, in effect, repeated for the down state of the flowmeter and produce a further flow value before being directed back to block 295 to begin again. This repetition for the down state is indicated by labelling the remaining blocks of the flow chart of FIG. 19 with the same numbers as the corresponding already described blocks thereof, with the addition of the suffix D. This repetition will also be understood to extend to the sampling routine discussed in connection with FIG. 20, which routine can be called during either the up or the down segments of the flow measurement routine of FIG. 19.

The above-described flow measurement process will continue to produce a succession of flow values until interrupted by a user or program initiated stop request in accordance with block 295. This succession of values will include a new flow value each 10 ms, as described in connection with FIG. 15, and produce 100 flow rate values per second, a number that is substantially equal to the total number of up and down transmission events that occur during that second. This 100 per second measurement rate is, of course, exemplary only and may be made higher or lower by changing the frequency of master oscillator 90 and the operating parameters of clock generating network 95.

In the event that the fluid parameter of interest is total volume of flow, rather than the volume rate of flow, the total volume of flow may be calculated, from the above-described succession of volume rate of flow values. This is preferably accomplished by means of a summation process that approximates the effect of integrating the flow rate as a function of time. If, for example, the flow rate is assumed to remain constant for the 10 ms time interval between successive flow rate determinations, then the total volume of flow may be approximated by summing the products of the flow rates and their respective durations over a time period equal to the period of interest. Since the flowmeter of the invention provides a new flow rate value every 10 ms, this summation process yields results that are highly accurate, particularly in applications, such as spirometers, in which the rate of flow of the fluid of interest does not change substantially between measurements.

The Calibration Process

In achieving the high accuracy and repeatability contemplated by the invention, one very important contributing factor is the method by which the flowmeter is calibrated. In accordance with one feature of this method, the calibration process, like the measurement process which follows it, is based directly on physical measurements, rather than on equations that are derived from theoretical considerations, thereby assuring a high degree of correspondence with real conditions. In accordance with a second feature of this method, the calibration process requires the application and passing of a number of acceptability tests which are designed to indicate the presence of conditions that are likely to occur if the flowmeter is not operating in the desired manner. Such conditions may, for example, include the presence or accumulation of obstructions and contaminants such as dirt and mucous, phase ambiguities, etc. By preventing the flowmeter from taking flow measurements until it is determined that these conditions are absent, the calibration method of the invention assures the absence of errors of a systemic nature.

The manner in which the calibration method of the invention produces these results will now be described with reference to the flow charts and diagrams of FIGS. 21 through 28. Turning first to FIG. 21, there is shown a flow chart which provides an overview of the calibration process. Generally speaking, this flow chart illustrates the steps that occur between the completion of the start-up procedure which was discussed in connection with FIGS. 17 and 18, and the flow measurement procedure which was discussed in connection with FIGS. 19 and 20.

Figure 22:
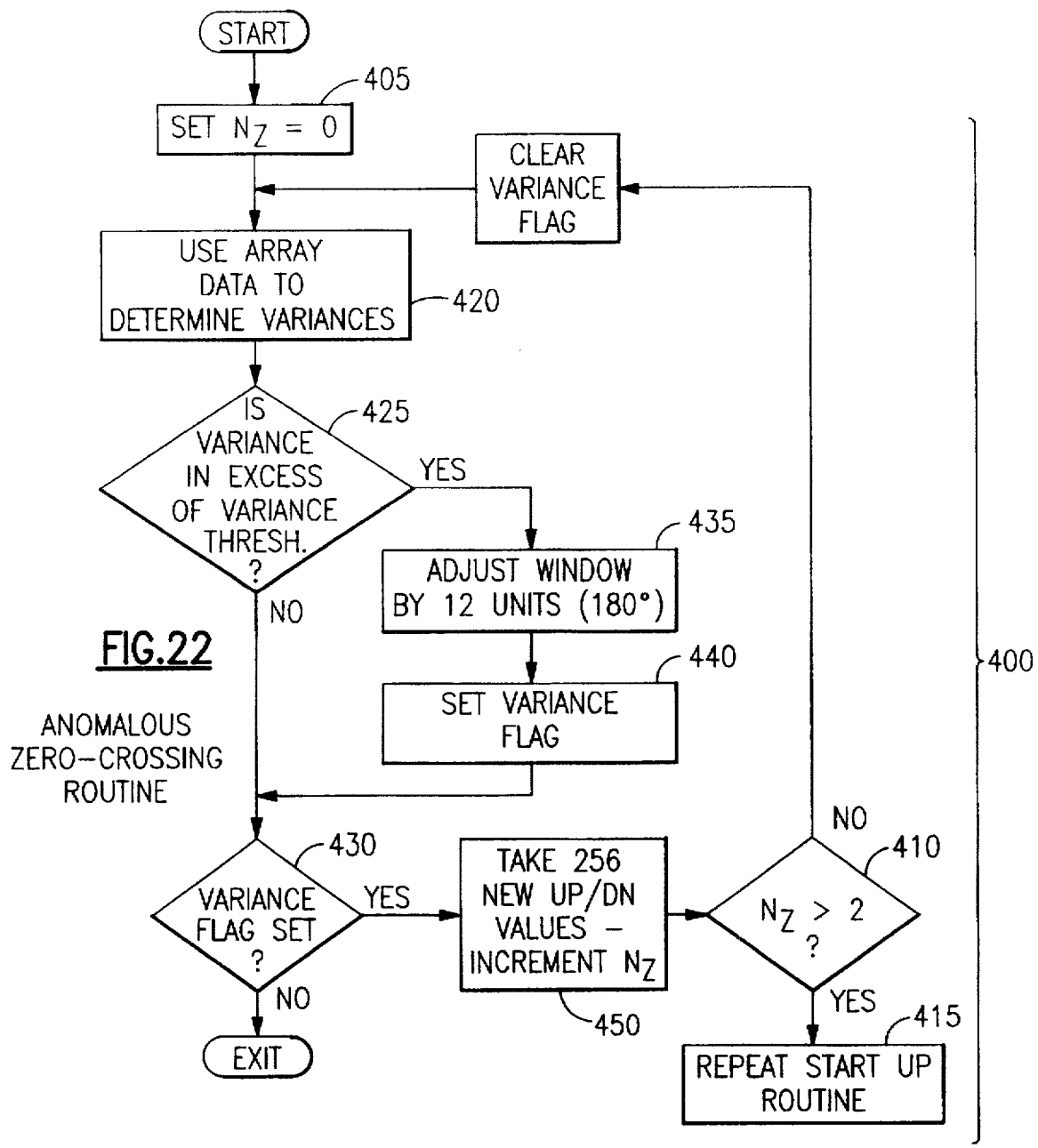
Figure 23:
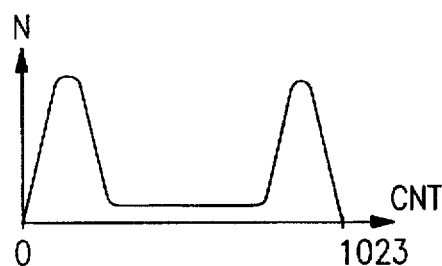
FIG. 23 shows one type of bimodal distribution for sample count data taken during calibration.

The calibration process of FIG. 21 begins with a block 400, which calls for the processor to execute the anomalous zero crossing routine shown in FIG. 22. As will be described more fully later in connection with FIG. 22, this involves the application of a statistical test that is designed to detect the presence of high degrees of bimodality in the distribution of the data stored in the arrays filled during the start-up procedure. An example of a distribution having a high degree of bimodality is shown in FIG. 23, which shows the number of occurrences of the count values as a function of count value. The use of this test as an anomalous zero crossing detector is based on the recognition that, if a flowmeter is using a zero crossing of the wrong sign, the count value will jump between two extreme sets of values. One of these sets of values results from repeated occurrence of overflow conditions in the sampling counter, and the other results from the repeated occurrence of the short counts that follow such overflow conditions. Thus, the calibration process of the invention allows this undesired condition to be identified by its effects, rather than by the relationships which exists between the voltages and currents of the flowmeter over all four quadrants of their characteristics.

One example of how an anomalous zero crossing might be detected and corrected will now be described with reference to FIG. 22. This evaluation begins with an initialization block 405 which operates in conjunction with a decision block 410 to limit the number of repetitions of the test to two, although values other than two may also be used. If no acceptable result is achieved within two attempts, the processor is directed to block 415 which, in turn, causes the processor to abandon the last taken set of start-up data and repeat the start-up procedure in an attempt to obtain a set of start-up data which is acceptable, i.e., which is based on a zero crossing of the correct sign. If an acceptable result is achieved, the processor will exit the flow chart of FIG. 22 and return to the calibration routine shown in FIG. 21.

In performing its statistical evaluation, the flow chart of FIG. 22 operates in the following manner. On encountering block 420, the processor is directed to use the data stored in the start-up array to determine the variance thereof. This determination is actually performed twice, once for the up counts and once for the down counts. Since the steps involved in variance calculations are well known to those skilled in the programming art, the particulars of these calculations will not be specifically described herein. Once these variance have been determined, they are compared to a variance threshold value, as called for by block 425. Since the variance of a distribution is measure of the degree to which that distribution is dominated by values that are far from the mean value thereof, this threshold value defines the maximum degree of bimodality that is consistent with the flowmeter having used the correct, i.e., the positive going, zero crossing for the flowmeter, as described in connection with FIGS. 1–10, a typical value for this variance threshold is less than or equal to 0.5.

If the variance of the start up count distribution is not in excess of the variance threshold set by block 425, the processor is directed to decision block 430, which directs it to exit the anomalous zero crossing routine unless a variance flag is set. Since this flag is set via block 440 only if the variance threshold has been exceeded, the no state of this flag means that the variance test imposed by block 425 has been passed. Under this condition the processor is directed to return to the calibration routine of FIG. 21.

If the variance test imposed by block 425 is not passed, it is assumed that the flowmeter is using the wrong zero crossing. Under this condition the processor is directed to block 435, which causes it to attempt to shift the phase position of the reference window by just enough to cause the reference transition to change from its presumed association with the negative going zero crossing to an association with the positive going zero crossing. This is preferably accomplished by adding 12 counts to each reference window count that has an anomalous variance. Since the drive signal has a period of 25 µs and each window count corresponds to one µs, these 12 counts approximate one-half of a drive signal period or 180°, thus effectively forcing a change in zero crossing.

After the above-described window adjustment, the processor is directed to block 440 which causes the setting of the variance flag. The latter flag is merely a control variable which, together with control variable $N_z$ and block 410, assures that the processor makes no more than two attempts to complete the calibration sequence by using the window adjustment step called for by block 435. More or fewer than two attempts may also be used, but the latter is preferred as a reasonable compromise value.

After one or both reference windows have been adjusted and the variance flag is set, the processor is directed to previously mentioned block 430. Since the variance flag is set, the latter block directs the processor to block 450. This block causes the processor to take 256 new up and down count values and, unless this has occurred more than twice before, try again to pass the variance test of block 425. Together with the window adjustment of block 435, this gives the flowmeter two opportunities to successfully complete the anomalous zero crossing routine without having to repeat the start up routine. If the flowmeter fails to pass the variance test after more than two of these opportunities, the processor is directed back to the start up routine to begin again from a known initial state. Ordinarily the flowmeter will pass this test, however, and return to the calibration routine of FIG. 21 to be tested against the remaining acceptability criteria contemplated by the calibration process of the invention.

Returning to the flow chart of FIG. 21, the calibration process continues with blocks 455 through 493. Of these, blocks 455, 491 and 493 define a test loop that sets an upper limit on the number of times that the flowmeter may try to pass the remaining acceptability tests, in this case 32. Block 460 defines and imposes these acceptability tests, two exemplary ones of which are shown in the acceptability test routine of FIG. 24.

In the preferred embodiment, the acceptability tests performed by the acceptability test routine of FIG. 24 are designed to establish two independent criteria for the acceptability of the count data distribution. Both of these tests are applied to the two most frequently occurring count values, C1 and C2, of the up and down count distributions, as determined in accordance with the steps called for by block 465 of FIG. 24.

The first of these tests, imposed by block 470, tests whether the two most frequently occurring count values C1 and C2 are within 4 counts of each other, e.g. 499 and 502. If they are not within 4 counts, it is known that the count data distribution is characterized by two peak values that are sufficiently separated from one another to indicate a that the distribution has an appreciable degree of bimodality. Under this condition the bimodality test is failed and the processor is directed to return to the flow chart of FIG. 21 at block 493, which causes it to retry the test (if the number of retrys is not greater than 32) or to stop and display to the operator the message that calibration has failed. If they are within 4 counts, the bimodality test is passed, and the processor proceeds to the next test.

The second of these tests, imposed by block 475, tests whether the number of occurrences at the two most frequently occurring count values is greater than the sum of the numbers of occurrences of all other count values. This test has the effect of distinguishing between highly peaked or relatively concentrated count distributions and less highly peaked or relatively dispersed count distributions. An example of the desired highly peaked distribution is shown in FIG. 25A, together with a fragment of an array of the type which gives rise to such a distribution. An example of an insufficiently peaked distribution is shown in FIG. 25B, together with a fragment of an array of the type which gives rise to the latter distribution.

One advantage of what may be termed this "peakiness" test is that it provides a sensitive measure of the degree to which the flowmeter has converged to and stabilized at the desired, repeatable value. Since this test is performed at a known temperature the count values need to be corrected for the effect of temperature only if the transducers are operating at a temperature different from their nominal temperature.

Another advantage of this peakiness test is that it may be easily adapted to a variety of different applications. If, for example, the test is too strict for a particular application, it may be reformulated so that the three or four most frequently occurring count values are used and/or that some other total number of occurrences be found among the remaining count values. The same is true of the bimodality test described earlier in connection with block 470. It will, therefore, be understood that the invention is not limited to the particular exemplary values mentioned herein, or even to tests that are formulated in the manner shown in blocks 470 and 475. One the contrary, the present invention contemplates any test or tests which are based on the measured distribution of count values, and which are designed to the passed only if the operation of the flowmeter has become so regular that the count values produced thereby meet the ultimate criteria of stability and repeatability.

If an acceptable count distribution cannot be achieved after the maximum permissible number of attempts, the calibration process is regarded as having failed, and the processor is directed to block 495. This block causes to processor to discontinue the calibration process and indicate to the user as, for example, via display 18, that it has done so. This informs the user the flowmeter needs to be checked for systemic problems such as obstructions, dirt, etc. and then restarted and calibrated from the beginning.

If an acceptable count distribution has been achieved, the test phase of the calibration process is regarded as having been successfully completed and the processor is directed to block 497. This block represents a calibration routine, such as one of the calibration routines to be described presently in connection with FIGS. 27 and 28, which determines the value of calibration coefficient $K_c$. (See equation (1) of FIG. 13). Once the latter coefficient has been determined, the calibration process is complete and the flowmeter is in condition to begin producing flow data in the manner described earlier in connection with the flow charts of FIGS. 19 and 20.

Figure 27:
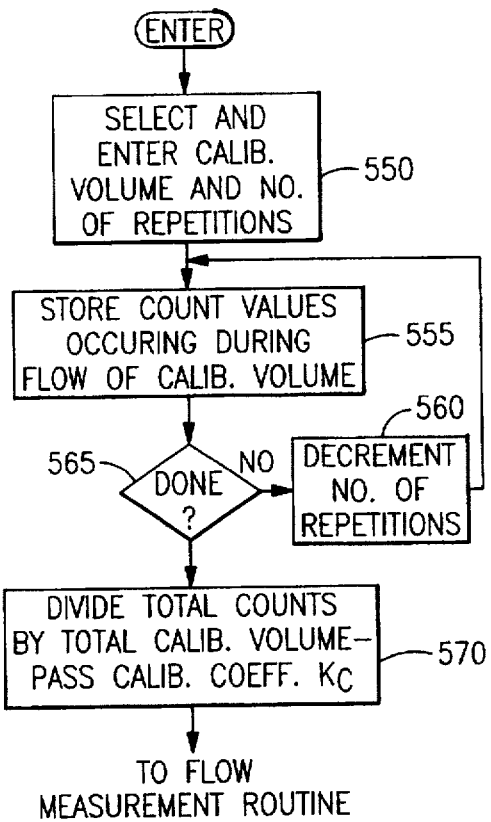
FIGS. 27 and 28 are flow charts for alternative methods of determining the calibration coefficient used by the flowmeter of the invention.
Figure 28:
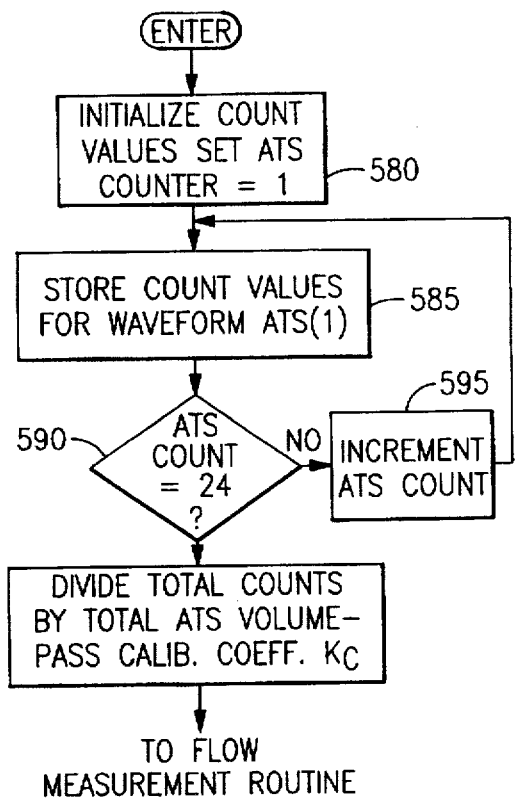

The determination of calibration coefficient $K_c$ will now be described firstly with reference to embodiments of FIGS. 26A and 26B and secondly with reference to the embodiments of FIGS. 27 and 28. Generally speaking, the calibration coefficient determination process illustrated in FIGS. 26A and 26B is best suited to general purpose flow measurements, while the coefficient determination process illustrated in FIGS. 27 and 28 is best suited to spirometric flow measurements.

Figure 26B:
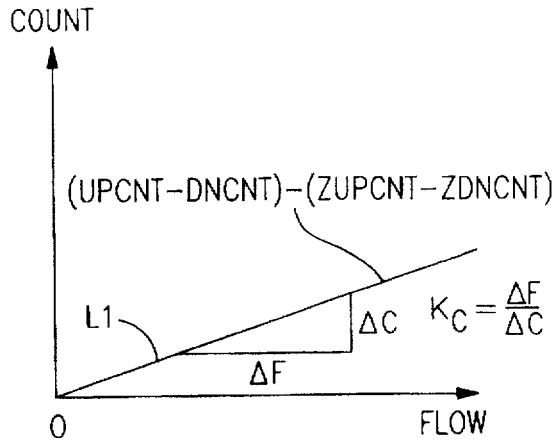

Turning first to FIGS. 26A and 26B, a series of measured count values are shown as a function of flow rate. In FIG. 26A these count values are shown in their raw form, i.e., without being corrected for the zero up and down count values ZUPCNT and ZDNCNT, which are measured under a condition of zero flow. In FIG. 26B the count values are shown in their corrected form, i.e., after the subtraction of the zero up and down count values therefrom. The result is a straight line segment L1, which passes through the origin of FIG. 26B. It will therefore be seen that, once sample count data has been taken at an unknown flow rate, the unknown flow rate can be easily determined from the slope of line L1, using the slope-intercept form (y=mx+b) of the equation therefor, with b=0. This slope value, which specifies the rate of change of flow per unit change in count value, i.e., $\Delta F$ divided by $\Delta C$, defines calibration coefficient $K_c$. It is this definition, and it's basis in measured values, that is responsible for the simple form of equation (1) of FIGS. 13 and 14, and for the fact that flow measurements made by flowmeter of the invention are based directly on measured values, rather than on the calculated theoretical values used by prior art flowmeters.

In fixing the value of the calibration coefficient for the flowmeter of the invention any two different known flow values may be used, since any two such values will fix the slope of a line such as L1 of FIG. 26B. In the preferred embodiment, one of these known flow values is selected to be zero flow. This is because a condition of zero flow is easy to establish and allows offset value ZUPCNT - ZDNCNT to be determined by direct measurement. Two non-zero known flow values may also be used, however, provided that there is available a calibration source that is able to establish such flow values. In such cases, effect value ZUPCNT-ZDNCNT (term b in equation y=mx+b) may be calculated from the linear equation relating these two non-zero known flow values, using the well known two-point form of the equation for a straight line.

When the flowmeter of the invention is used as a spirometer, it is desirable to determine calibration coefficient $K_c$ using a known volume of calibration gas that flows at a variable rate. Two different exemplary ways in which calibration coefficient $K_c$ may be determined in this way will now be described in connection with FIGS. 27 and 28.

Turning now to FIGS. 27 and 28 there are shown flow charts for calibration coefficient determinations which make use of a large, calibrated syringe to set the known volume of calibration gas, e.g., a syringe having a maximum capacity of 3 liters of air at STP. By starting with a syringe at rest, and moving the piston, the flow through the flowmeter may be made to rise from zero to a peak value and fall back to zero, while dispensing the desired known volume of air over a known period of time. By also controlling the speed of motion during this time, this flow of air may be made to have any desired flow profile or flow rate as a function of time. With such a calibration procedure, the calibration coefficient is preferably determined by adding the total number of counts produced during the flow of the selected volume of calibration gas, and the dividing that total count by the calibration volume.

In the case of FIG. 27, the above-described approach is applied as a part of a calibration process that includes a plurality of similar syringe operations. With this process the calibration coefficient is determined using an averaging process by adding the total number of counts produced during a number of substantially identical syringe operations and dividing by the total volume dispensed during those operations. This reduces the effect of small random fluctuations in total count from operation to operation, and thereby assures a more repeatable result. It may also, however, be applied as a part of a calibration process that includes a plurality of dissimilar syringe operations, as will be explained in connection with FIG. 28.

Referring to FIG. 27, the $K_c$ determination begins with a block 550, which calls for the operator to select and enter the desired calibration volume and the number of times it will be repeated as, for example, through keyboard 16. Then, while the operator or a mechanized piston drive mechanism operates the syringe, the processor stores the total number of counts produced during these operations, in accordance with block 555, until the desired number of operations has occurred, as called for by blocks 560 and 565. When this number of operations has been completed, the processor is directed to block 570, which cause it to calculate calibration coefficient $K_c$ by dividing the total count by the total volume and multiplying by a constant that will present the final result in the desired units. The processor may then continue on to the flow measurement routine to produce a series of measurements in the manner described in connection with FIGS. 19 and 20.

In the alternative embodiment of FIG. 28, the calibration procedure is broadly similar to that of FIG. 27, except that the syringe operations differ from one another. In particular, the embodiment of FIG. 28 contemplates the use of syringe operations that produce flows that conform to different ones of the standard flow profiles established by the American Thoracic Society (ATS). Syringe operations that conform to these flow profiles are preferably performed, one after another, with the aid of a suitable syringe driving apparatus, with the ATS profile being controlled by an ATS counter initialized by block 580 and controlled by control blocks 585 through 595. The cumulative total count may then be divided, as before, by to known total volume of flow to determine calibration coefficient $K_c$ before continuing on to the flow measurement routine.

In view of the foregoing, it will be seen that, once the acceptability of the calibration data has been verified, as described in connection with FIGS. 21 and 24, the calibration process may be completed in a variety of different ways, depending upon the use to which the flowmeter will be put. Thus, the calibration method of the present invention is not limited to any particular way of determining calibration coefficient $K_c$.

Figure 29:
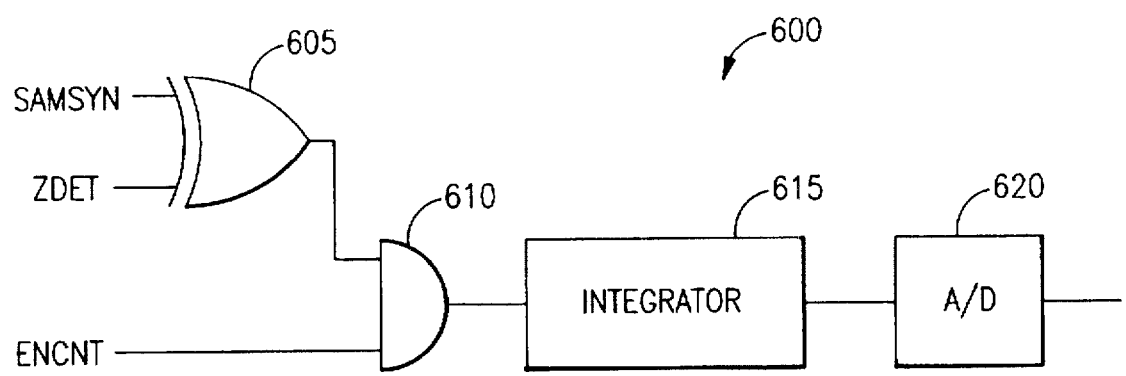
FIG. 29 is a logic diagram of a circuit that may be used in adjusting calculated flow values for the effect of transducer temperature.

Referring to FIG. 29, there is shown an alternative embodiment of the temperature correction feature of the present invention. Unlike the embodiment described in connection with FIGS. 14 and 16A–16C, the embodiment of FIG. 29 includes hardwired circuitry. With the embodiment of FIG. 29 the objective is to measure magnitude of the temperature-related component of the measured sample data. As explained in connection with FIG. 16C, the amount of this magnitude is related to the area between sloped line L and the horizontal line corresponding to count C. Once the magnitude of this temperature-related component has been measured, it may be used to correct the measured sample data for the effect of temperature related deviations from the nominal resonant frequencies of the transducers. If desired, this correction may be applied prior to the flow calculation as, for example, in the manner shown in equations (2) and (3) of FIG. 14. Alternatively, this correction may be applied after the flow calculation has been performed, pre- and post-calculation temperature corrections being equivalent to one another for purposes of the present invention.

In the hardwired embodiment of FIG. 29, the temperature correction measuring circuitry 600 includes a phase detector circuit 605, which may take the form of an exclusive—OR gate, an AND gate 610, and an integrating circuit 615, which may be either analog or digital. If integrator 615 is an analog device, temperature correction circuit 600 should also include a suitable analog-to-digital (A/D) converter 620.

During operation, phase detector 605 produces an output signal the duration of which is proportional to the count values described earlier in connection with FIG. 16B. Gate 610 serves to assure that this output signal is integrated by integrator 615 only during the reference window. As a result, the output of the integrator will be related to the total number of sample counts for the respective burst, including those counts that are temperature related. Together with the output of the integrator, as measured after the first sampling event, this output enables the flowmeter circuitry to determine the magnitude of the temperature related error component thereof. The associated flow calculation may then be corrected in the manner already described. Since the specifics of the operation of temperature connection circuit 600 will be apparent to those skilled in the art, these specifics will not be described in detail herein.

While the invention has necessarily been described with reference to a number of specific examples and embodiments, it will be understood that the true spirit and scope of the present invention should be determined only with reference to the appended claims.

What is claimed is:

1. A method for calibrating and using a fluid flow measuring apparatus of the type including first and second sound transducers for transmitting and receiving acoustic pulses along a path through said fluid, each of said transducers serving to transmit an acoustic output signal when driven by a suitable electrical input signal and to generate an AC output signal when driven by a suitable acoustic input signal, said apparatus having a first state in which said first transducer is a transmitting transducer and said second transducer is a receiving transducer, and a second state in which said second transducer is a transmitting transducer and said first transducer is a receiving transducer, including the steps of:

a) causing said fluid to flow through said apparatus at a first predetermined rate;

b) taking a first plurality of zero crossing time measurements on said AC output signal when said apparatus is in its first state, and a second plurality of zero crossing time measurements on said AC output signal when said apparatus is in its second state;

c) testing said first and second pluralities of measurements to determine if the distribution of said measurements meet at least one predetermined acceptability criteria; and i) if said distribution meets said acceptability criteria, using said measurements to calculate at least one first calibration value for said apparatus;

ii) if said distribution does not meet said acceptability criteria, repeating steps (b) and (c);

d) causing said fluid to flow through said apparatus at a second predetermined rate;

e) taking a first plurality of time-of-flight measurements when said apparatus is in its first state and a second plurality of time-of-flight measurements when said apparatus is in its second state;

f) using the results of step (e) to calculate at least one second calibration value for said apparatus; and g) storing said first and second calibration values for use in calculating unknown flow rates from subsequent zero crossing time measurements.

2. The method of claim 1 in which said first predetermined flow rate is zero and in which said second predetermined flow rate is equal to at least a substantial fraction of the maximum measurable flow rate of said fluid.

3. The method of claim 2 in which the result of said zero crossing time measurements comprise counts indicative of the occurrence times of respective zero crossings of said AC output signal, the counts measured during said first state comprising upcounts and the counts measured during said second states comprising downcounts.

4. The method of claim 3 in which said first calibration value comprises a count value which corresponds to the zero offset of the apparatus, and in which said second calibration value comprises a calibration coefficient indicative of the rate of change of flow with respect to count.

5. The method of claim 1 in which the result of said zero crossing time measurements comprise counts indicative of the occurrence times of respective zero crossings of said AC output signal, the counts measured during said first state comprising upcounts and the counts measured during said second states comprising downcounts.

6. The method of claim 5 in which one of said acceptability criteria comprises the presence, between the two highest ones of said upcounts or downcounts, of more than a predetermined number of upcounts or downcounts.

7. The method of claim 1 in which said testing step includes determining whether the distributions of said first and second pluralities of measurements are bimodal and, if said distributions are bimodal, indicating that one of said acceptability criteria has not been met.

8. The method of claim 7 in which said testing step includes the step of calculating the variances of said first and second pluralities of measurements and, if said variances are greater than a predetermined variance threshold, indicating that one of said acceptability criteria has not been met.

9. The method of claim 1 in which said testing step includes the step of calculating the variances of said first and second pluralities of measurements and, if said variances are greater than a predetermined variance threshold, indicating that one of said acceptability criteria has not been met.

10. A method for calibrating and using a fluid flow measuring apparatus of the type including first and second sound transducers for transmitting and receiving acoustic pulses along a path through said fluid, each of said transducers serving to transmit an acoustic output signal when driven by a suitable electrical input signal and to generate an AC output signal when driven by a suitable acoustic input signal, said apparatus having a first state in which said first transducer is a transmitting transducer and said second transducer is a receiving transducer, and a second state in which said second transducer is a transmitting transducer and said first transducer is a receiving transducer, including the steps of:

a) establishing a flow of said fluid through the apparatus at a first known flow rate;

b) for each of said first and second states, applying bursts of electrical drive pulses to the transmitting transducers, and deriving from the output signals of the receiving transducers upcount and downcount values indicative of the elapsed times between the drive pulses applied to the transmitting transducers and the zero crossings of the output signals of the receiving transducers;

c) storing said upcount and downcount values in a form that indicates the frequency of occurrence thereof;

d) applying to said stored upcount and downcount values at least one test to determine if said values have an acceptable distribution and, if said stored values pass said at least one test, using said stored values to determine a first calibration value for said apparatus;

e) establishing a flow of said fluid through said apparatus at a second known flow rate;

f) repeating step (b) for said second known flow rate;

g) using the results of step (f) to determine a second calibration value for said apparatus;

h) storing said first and second calibration values for use in calculating unknown flow rates from subsequently measured upcount and downcount values.

11. The method of claim 10 in which said first known flow rate is zero flow, and in which said first calibration value is the zero offset of said apparatus.

12. The method of claim 11 in which said second calibration value is a constant that varies in accordance with the rate of change of flow with respect to count at said second flow rate.

13. The method of claim 10 in which said second calibration value reflects the rate of change of flow with respect to count at said second flow rate.

14. The method of claim 10 in which said step of storing upcount and downcount values comprises storing, for each upcount and downcount value, a number indicative of the number of times that upcount or downcount value has occurred.

15. The method of claim 14 in which one of said at least one test includes testing the distribution of upcount and downcount values for the presence of a bimodal distribution.

16. The method of claim 14 in which one of said at least one tests includes the step of calculating variances for said upcount and downcount values, and comparing the resulting variances with a predetermined variance threshold.

17. The method of claim 14 in which one of said at least one tests includes the step of determining the presence, between the two highest ones of said upcount or downcount values, of more than a predetermined number of upcount or downcount values.

18. The method of claim 10 in which one of said at least one test includes testing the distribution of upcount and downcount values for the presence of a bimodal distribution.

19. The method of claim 10 in which one of said at least one tests includes the step of calculating variances for said upcount and downcount values, and comparing the resulting variances with a predetermined variance threshold.

20. The method of claim 10 in which one of said at least one tests includes the step of determining the presence, between the two highest ones of said upcount or downcount values, of more than a predetermined number of other upcount or downcount values.

* * * * *